United States Patent
Saitoh

(10) Patent No.: US 7,645,400 B2
(45) Date of Patent: Jan. 12, 2010

(54) COMPOSITION CONTAINING CARBON NANOTUBES HAVING A COATING

(75) Inventor: Takashi Saitoh, Tsukuba (JP)

(73) Assignee: Mitsubishi Rayon Co., Ltd., Minato-Ku, Tokyo (JP)

( * ) Notice: Subject to any disclaimer, the term of this patent is extended or adjusted under 35 U.S.C. 154(b) by 0 days.

(21) Appl. No.: 10/532,685

(22) PCT Filed: Oct. 31, 2003

(86) PCT No.: PCT/JP03/14027

§ 371 (c)(1),
(2), (4) Date: Apr. 26, 2005

(87) PCT Pub. No.: WO2004/039893

PCT Pub. Date: May 13, 2004

(65) Prior Publication Data

US 2006/0052509 A1    Mar. 9, 2006

(30) Foreign Application Priority Data

| Nov. 1, 2002 | (JP) | 2002-319551 |
|---|---|---|
| Nov. 1, 2002 | (JP) | 2002-319552 |
| Sep. 3, 2003 | (JP) | 2003-311926 |
| Sep. 3, 2003 | (JP) | 2003-311927 |
| Oct. 28, 2003 | (JP) | 2003-367533 |

(51) Int. Cl.
*H01B 1/06* (2006.01)
(52) U.S. Cl. .................. 252/511; 252/500; 252/502; 524/495; 977/742; 977/745; 977/746; 977/753
(58) Field of Classification Search .............. 252/500; 255/500, 502, 511; 524/495; 977/742, 745, 977/746, 753
See application file for complete search history.

(56) References Cited

U.S. PATENT DOCUMENTS

| 4,937,060 | A | 6/1990 | Kathirgamanathan et al. |
|---|---|---|---|
| 4,956,441 | A | 9/1990 | Kathirgamanathan et al. |
| 5,256,454 | A | 10/1993 | Murai et al. |
| 5,354,816 | A | 10/1994 | Shimizu et al. |
| 5,437,893 | A | 8/1995 | Murai et al. |
| 5,569,708 | A | 10/1996 | Wudl et al. |
| 5,589,270 | A | 12/1996 | Murai et al. |
| 5,863,981 | A | 1/1999 | Wudl et al. |
| 5,891,968 | A | 4/1999 | Wudl et al. |
| 6,187,823 | B1 | 2/2001 | Haddon et al. |
| 7,115,751 | B2 | 10/2006 | Maeda et al. |
| 2002/0161101 | A1* | 10/2002 | Carroll et al. ............... 524/495 |
| 2003/0077515 | A1* | 4/2003 | Chen et al. ............... 429/231.8 |
| 2003/0122111 | A1* | 7/2003 | Glatkowski ............... 252/500 |
| 2004/0021131 | A1* | 2/2004 | Blanchet-Fincher et al. 252/500 |
| 2004/0206942 | A1* | 10/2004 | Hsu ............... 252/500 |
| 2004/0266939 | A1* | 12/2004 | Chen et al. ............... 524/496 |

FOREIGN PATENT DOCUMENTS

| EP | 0540448 A1 | 5/1993 |
|---|---|---|
| JP | 61-197633 A | 9/1986 |
| JP | 63-039916 A | 2/1988 |
| JP | 1-301714 A | 12/1989 |
| JP | 4-32848 A | 2/1992 |
| JP | 4-268331 A | 9/1992 |
| JP | 4-328181 A | 11/1992 |
| JP | 5-503953 A | 6/1993 |
| JP | 5-178989 A | 7/1993 |
| JP | 5-504153 A | 7/1993 |
| JP | 5-226238 A | 9/1993 |
| JP | 6-032845 A | 2/1994 |
| JP | 6-049183 A | 2/1994 |
| JP | 6-056987 A | 3/1994 |
| JP | 6-087949 A | 3/1994 |
| JP | 6-145386 A | 5/1994 |
| JP | 6-256516 A | 9/1994 |
| JP | 6-293828 A | 10/1994 |

(Continued)

OTHER PUBLICATIONS

STN search report. p. 1-4.*
STN search report indicating the structures of Glatkowski reference (Feb. 2003).*
Sumio Iijima, "Helical microtubules of graphitic carbon," Nature, vol. 354, p. 56, (Nov. 7, 1991).
Liu et al., "Fullerene Pipes," Science, vol. 280, p. 1253 (May 22, 1998).

(Continued)

*Primary Examiner*—Mark Kopec
*Assistant Examiner*—Tri V Nguyen
(74) *Attorney, Agent, or Firm*—Fitch, Even, Tabin & Flannery; Kendrew H. Colton

(57) ABSTRACT

The object of the present invention is to provide a carbon nanotube composition that does not impair the characteristics of the carbon nanotubes itself, allows the carbon nanotubes to be dispersed or solubilized in a solvent, does not cause separation or aggregation of the carbon nanotubes even during long-term storage, has superior electrical conductivity, film formability and moldability, can be easily coated or covered onto a base material, and the resulting coated film has superior moisture resistance, weather resistance and hardness; a composite having a coated film composed thereof; and, their production methods. In order to achieve this object, the present invention provides a carbon nanotube composition that contains a conducting polymer (a) or heterocyclic compound trimer (i), a solvent (b) and carbon nanotubes (c), and may additionally contain a high molecular weight compound (d), a basic compound (e), a surfactant (f), a silane coupling agent (g) and colloidal silica (h) as necessary; a composite having a coated film composed of the composition; and, their production methods.

1 Claim, No Drawings

FOREIGN PATENT DOCUMENTS

| | | |
|---|---|---|
| JP | 7-041756 A | 2/1995 |
| JP | 7-048436 A | 2/1995 |
| JP | 7-118524 A | 5/1995 |
| JP | 7-196791 A | 8/1995 |
| JP | 7-324132 A | 12/1995 |
| JP | 9-059376 A | 3/1997 |
| JP | 10-060108 A | 3/1998 |
| JP | 2000-191774 A | 7/2000 |
| JP | 2000-219739 * | 8/2000 |
| JP | 2001-011344 A | 1/2001 |
| JP | 2001-11344 A | 1/2001 |
| JP | 2001-261680 A | 9/2001 |
| JP | 2002-140930 A | 5/2002 |
| JP | 2003-187652 A | 7/2003 |
| JP | 2003-292801 A | 10/2003 |
| JP | 2004-002621 A | 1/2004 |
| JP | 3706825 | 10/2005 |
| JP | 3747167 | 2/2006 |
| WO | WO 91/05979 A | 5/1991 |
| WO | WO 91/06887 A | 5/1991 |
| WO | WO 02/32903 | 4/2002 |
| WO | WO 03/013199 A2 * | 2/2003 |

OTHER PUBLICATIONS

Chen et al., "Solution properties of single-walled carbon nanotubes," Science, vol. 282, p. 95 (Oct. 2, 1998).

Nakashima et al., "Water-soluble single-walled carbon nanotubes via noncovalent sidewall-functionalization with a pyrene-carrying ammonium ion," Chemistry Letters p. 638 (2002).

* cited by examiner

COMPOSITION CONTAINING CARBON NANOTUBES HAVING A COATING

This Application is the National Phase of International Application No. PCT/JP03/14027 filed Oct. 31, 2003, and claims the priority from Japanese Application Nos. JP 2002-319551 filed Nov. 1, 2002, JP 2002-319552 filed Nov. 1, 2002, JP 2003-311926 filed Sep. 3, 2003, JP 2003-311927 filed Sep. 3, 2003, and JP 2003-367533 filed Oct. 28, 2003, the complete disclosures of which are incorporated herein by reference.

TECHNICAL FIELD

The present invention relates to a carbon nanotube composition, a composite having a coated film composed of the same, and their production methods.

BACKGROUND ART

Ever since carbon nanotubes were first discovered by Iijima, et al. in 1991 (S. Iijima, Nature, 354, 56 (1991)), their physical properties have been evaluated and their functions have been elucidated, and extensive research and development have been conducted on their application. However, since carbon nanotubes are produced in an entangled state, they have the shortcoming of being extremely bothersome to handle. In the case of mixing into resins and solutions, there is also the problem of the carbon nanotubes becoming increasingly aggregated, thereby preventing them from demonstrating their inherent characteristics.

Consequently, attempts have been made to uniformly disperse or solubilize carbon nanotubes in solvents or resins by subjecting them to physical treatment or chemical modification.

For example, a method has been proposed in which single-walled carbon nanotubes are cut into short pieces and dispersed by subjecting to ultrasonic treatment in strong acid (R. E. Smalley, et al., Science, 280, 1253 (1998)). However, since treatment is carried out in strong acid, the procedure is complex and not suitable for industrial applications, while the dispersion effects cannot be said to be adequate.

Therefore, by noticing that both ends of single-walled carbon nanotubes cut in the manner proposed above are open, and that they are terminated with oxygen-containing functional groups such as carboxylic acid groups, it was proposed that carbon nanotubes be made soluble in solvent by introducing long-chain alkyl groups by reacting with an amine compound after having converted the carboxylic acid groups into acid chloride (J. Chen, et al., Science, 282, 95 (1998)). However, in this method, since long-chain alkyl groups are introduced into single-walled carbon nanotubes by covalent bonding, there was still the problem of damage to the graphene sheet structure of the carbon nanotubes and effects on the characteristics of the carbon nanotubes itself.

Another attempt to produce water soluble single-walled carbon nanotubes was reported that comprising introducing substituents containing ammonium ions in pyrene molecules by utilizing the fact that pyrene molecules are adsorbed onto the surfaces of carbon nanotubes by strong interaction, and subjecting these to ultrasonic treatment in water together with single-walled carbon nanotubes to non-covalently adsorb them to the single-walled carbon nanotubes (Nakajima, et al., Chem. Lett., 638 (2002)). According to this method, although damage to the graphene sheet structure is inhibited due to the non-covalent bonding chemical modification, since non-conducting pyrene compounds are present, there is the problem of a decrease in the conductivity of the resulting carbon nanotubes.

DISCLOSURE OF THE INVENTION

The object of the present invention is to provide a carbon nanotube composition that does not impair the characteristics of the carbon nanotubes itself, allows the carbon nanotubes to be dispersed or solubilized in water, organic solvents, water-containing organic solvents and other solvents, does not cause separation or aggregation of the carbon nanotubes even during long-term storage, has superior electrical conductivity, film formability and moldability, can be easily coated or covered onto a base material, and the resulting coated film has superior moisture resistance, weather resistance and hardness. The object of the present invention is also to provide a composite having a coated film comprising the carbon nanotube composition as well as production methods of the carbon nanotube composition and the coated film.

As a result of extensive research to solve these problems, the inventor of the present invention found that carbon nanotubes can be dispersed or solubilized in solvent by placing in the presence of a conducting polymer, thereby leading to completion of the present invention.

Namely, a first aspect of the present invention is a carbon nanotube composition that contains a conducting polymer (a), a solvent (b) and carbon nanotubes (c).

In the carbon nanotube composition of this first aspect of the present invention, since the carbon nanotubes (c) are added to the solvent (b) together with the conducting polymer (a), the carbon nanotubes (c) can be dispersed or solubilized in the solvent (b) without impairing the characteristics of the carbon nanotubes (c) itself, and there is no separation or aggregation even during long-term storage. Although the reason for this is not fully understood, the carbon nanotubes (c) are presumed to be dispersed or solubilized together with the conducting polymer (a) due to mutual adsorption by the conducting polymer (a) and the carbon nanotubes (c) due to the π-π interaction by π electrons.

In addition, in the carbon nanotube composition of the present invention, since the conducting polymer (a) and the carbon nanotubes (c) are used in combination, the resulting composition has superior electrical conductivity, film formability and moldability.

The performance of the carbon nanotube composition can be improved by additionally containing a high molecular weight compound (d), a basic compound (e), a surfactant (f) and a silane coupling agent (g) and/or a colloidal silica (h).

In addition, the conducting polymer (a) is preferably a water soluble conducting polymer, and more preferably a water soluble conducting polymer having at least one of a sulfonic acid group and a carboxyl group.

Moreover, as a result of extensive research to solve the aforementioned problems, the inventor of the present invention found that a composition containing a heterocyclic compound trimer and carbon nanotubes is suitable for this purpose, thereby leading to the present invention.

Namely, a second aspect of the present invention is a carbon nanotube composition that contains a heterocyclic compound trimer (i), a solvent (b) and carbon nanotubes (c). Similar to the carbon nanotube composition of the first aspect of the present invention, performance of the composition can be improved by additionally containing a high molecular weight compound (d), a basic compound (e), a surfactant (f), a silane coupling agent (g) and/or a colloidal silica (h).

The carbon nanotube compositions of the first and second aspects of the present invention enable the carbon nanotubes to be dispersed or solubilized in water, an organic solvent and a water-containing organic solvent without impairing the characteristics of the carbon nanotubes itself, and there is no separation or aggregation even during long-term storage. In addition, according to the carbon nanotube composition of the present invention, a coated film having superior electrical conductivity and film formability can be obtained free of temperature dependence by coating the composition onto a base material and allowing the coated film to demonstrate the characteristics of a conducting polymer, a heterocyclic compound trimer having a sulfonic acid group and a carboxyl group or carbon nanotubes itself. Moreover, the resulting coated film has superior moisture resistance, weather resistance and hardness.

A third aspect of the present invention is a production method of a carbon nanotube composition comprising mixing a conducting polymer (a) or a heterocyclic compound trimer (i), a solvent (b) and carbon nanotubes (c), and irradiating with ultrasonic waves. The carbon nanotubes can be efficiently dispersed or solubilized in the solvent by this ultrasonic treatment.

A fourth aspect of the present invention is a composite having a coated film composed of a carbon nanotube composition of the present invention on at least one surface of a base material.

In addition, a fifth aspect of the present invention is a production method of a composite comprising coating a carbon nanotube composition of the present invention onto at least one surface of a base material, and forming a coated film by allowing to stand at an ordinary temperature or subjecting to heating treatment.

BEST MODE FOR CARRYING OUT THE INVENTION

The following provides a detailed explanation of the present invention.

<Conducting Polymer (a)>

Conducting polymer (a) is a π-conjugated polymer containing as its repeating unit phenylene vinylene, vinylene, thienylene, pyrollylene, phenylene, iminophenylene, isothianaphthene, furylene or carbazolylene and so forth.

With respect to solubility in solvent in particular, a so-called water soluble conducting polymer is used preferably in the present invention. Here, a water soluble conducting polymer refers to a conducting polymer that has acidic groups, alkyl groups substituted with acidic groups or alkyl groups containing ether bonds on the backbone of a n-conjugated polymer or on nitrogen atoms of the polymer.

In addition, among these water soluble conducting polymers, a water soluble conducting polymer having at least one of a sulfonic acid group and a carboxyl group is used preferably in the present invention with respect to solubility in solvent, electrical conductivity and film formability.

Water soluble conducting polymers, disclosed in, for example, Japanese Unexamined Patent Application, First Publication No. S61-197633, Japanese Unexamined Patent Application, First Publication No. S63-39916, Japanese Unexamined Patent Application, First Publication No. H01-301714, Japanese Unexamined Patent Application, First Publication No. H05-504153, Japanese Unexamined Patent Application, First Publication No. H05-503953, Japanese Unexamined Patent Application, First Publication No. H04-32848, Japanese Unexamined Patent Application, First Publication No. H04-328181, Japanese Unexamined Patent Application, First Publication No. H06-145386, Japanese Unexamined Patent Application, First Publication No. H06-56987, Japanese Unexamined Patent Application, First Publication No. H05-226238, Japanese Unexamined Patent Application, First Publication No. H05-178989, Japanese Unexamined Patent Application, First Publication No. H06-293828, Japanese Unexamined Patent Application, First Publication No. H07-118524, Japanese Unexamined Patent Application, First Publication No. H06-32845, Japanese Unexamined Patent Application, First Publication No. H06-87949, Japanese Unexamined Patent Application, First Publication No. H06-256516, Japanese Unexamined Patent Application, First Publication No. H07-41756, Japanese Unexamined Patent Application, First Publication No. H07-48436, Japanese Unexamined Patent Application, First Publication No. H04-268331, Japanese Unexamined Patent Application, First Publication No. H09-59376, Japanese Unexamined Patent Application, First Publication No. 2000-191774, Japanese Unexamined Patent Application, First Publication No. H06-49183 and Japanese Unexamined Patent Application, First Publication No. H10-60108, are preferably used as a water soluble conducting polymer having at least one of a sulfonic acid group and a carboxyl group.

Specific examples of a water soluble conducting polymers having at least one of a sulfonic acid group and a carboxyl group include water soluble conducting polymers having at least one of a sulfonic acid group and a carboxyl group, an alkyl group substituted with at least one of a sulfonic acid group and a carboxyl group, or an alkyl group containing an ether bond, on the backbone of a π-conjugated polymer or nitrogen atoms of the polymer that contains as its repeating unit at least one type selected from the group consisting of non-substituted or substituted phenylene vinylene, vinylene, thienylene, pyrollylene, phenylene, iminophenylene, isothianaphthene, furylene and carbazolylene. In particular, among these, a water soluble conducting polymer having a backbone that contains thienylene, pyrollylene, iminophenylene, phenylene vinylene, carbazolylene or isothianaphthene is used preferably.

Preferable water soluble conducting polymers having at least one of a sulfonic acid group and a carboxyl group are the water soluble conducting polymers that contain 20 to 100% of at least one type of the repeating units selected from the following formulas (2) to (10) relative to the total number of repeating units throughout the entire polymer:

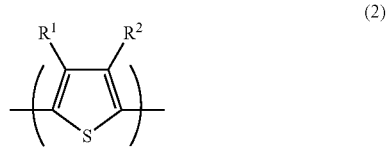

(2)

(in-the structural formula (2), wherein $R^1$ and $R^2$ are respectively and independently selected from the group consisting of H, —$SO_3^-$, —$SO_3H$, —$R^{35}SO_3^-$, —$R^{35}SO_3H$, —$OCH_3$, —$CH_3$, —$C_2H_5$, —F, —Cl, —Br, —I, —$N(R^{35})_2$, —NHCOR$^{35}$, —OH, —O$^-$, —SR$^{35}$, —OR$^{35}$, —OCOR$^{35}$, —$NO_2$, —COOH, —R$^{35}$COOH, —COOR$^{35}$, —COR$^{35}$, —CHO, and —CN, where $R^{35}$ represents an alkyl, aryl, or aralkyl group having 1 to 24 carbon atoms or an alkylene, arylene, or aralkylene group having 1 to 24 carbon atoms, and at least one of $R^1$ and $R^2$ is a group selected from the group consisting of —$SO_3^-$, —$SO_3H$, —$R^{35}SO_3^-$, —$R^{35}SO_3H$, —COOH and —$R^{35}COOH$);

(3)

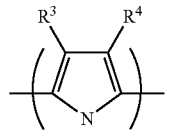

(in the structural formula (3), wherein $R^3$ and $R^4$ are respectively and independently selected from the group consisting of H, —$SO_3^-$, —$SO_3H$, —$R^{35}SO_3^-$, —$R^{35}SO_3H$, —$OCH_3$, —$CH_3$, —$C_2H_5$, —F, —Cl, —Br, —I, —$N(R^{35})_2$, —NHCOR$^{35}$, —OH, —O$^-$, —SR$^{35}$, —OR$^{35}$, —OCOR$^{35}$, —$NO_2$, —COOH, —$R^{35}$COOH, —COOR$^{35}$, —COR$^{35}$, —CHO, and —CN, where $R^{35}$ represents an alkyl, aryl, or aralkyl group having 1 to 24 carbon atoms or an alkylene, arylene, or aralkylene group having 1 to 24 carbon atoms, and at least one of $R^3$ and $R^4$ is a group selected from the group consisting of —$SO_3^-$, —$SO_3H$, —$R^{35}SO_3^-$, —$R^{35}SO_3H$, —COOH and —$R^{35}COOH$);

(4)

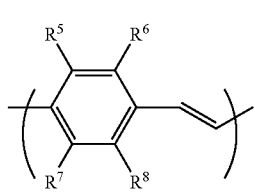

(in the structural formula (4), wherein $R^5$ to $R^8$ are respectively and independently selected from the group consisting of H, —$SO_3^-$, —$SO_3H$, —$R^{35}SO_3^-$, —$R^{35}SO_3H$, —$OCH_3$, —$CH_3$, —$C_2H_5$, —F, —Cl, —Br, —I, —$N(R^{35})_2$, —NHCOR$^{35}$, —OH, —O$^-$, —SR$^{35}$, —OR$^{35}$, —OCOR$^{35}$, —$NO_2$, —COOH, —$R^{35}$COOH, —COOR$^{35}$, —COR$^{35}$, —CHO and —CN, where $R^{35}$ represents an alkyl, aryl, or aralkyl group having 1 to 24 carbon atoms or an alkylene, arylene, or aralkylene group having 1 to 24 carbon atoms, and at least one of $R^5$ to $R^8$ is a group selected from the group consisting of —$SO_3^-$, —$SO_3H$, —$R^{35}SO_3^-$, —$R^{35}SO_3H$, —COOH and —$R^{35}COOH$);

(5)

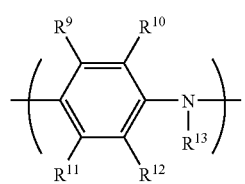

(in the structural formula (5), wherein $R^9$ to $R^{13}$ are respectively and independently selected from the group consisting of H, —$SO_3^-$, —$SO_3H$, —$R^{35}SO_3^-$, —$R^{35}SO_3H$, —$OCH_3$, —$CH_3$, —$C_2H_5$, —F, —Cl, —Br, —I, —$N(R^{35})_2$, —NHCOR$^{35}$, —OH, —O$^-$, —SR$^{35}$, —OR$^{35}$, —OCOR$^{35}$, —$NO_2$, —COOH, —$R^{35}$COOH, —COOR$^{35}$, —COR$^{35}$, —CHO, and —CN, where $R^{35}$ represents an alkyl, aryl, or aralkyl group having 1 to 24 carbon atoms or an alkylene, arylene or aralkylene group having 1 to 24 carbon atoms, and at least one of $R^9$ to $R^{13}$ is a group selected from the group consisting of —$SO_3^-$, —$SO_3H$, —$R^{35}SO_3^-$, —$R^{35}SO_3H$, —COOH and —$R^{35}COOH$);

(6)

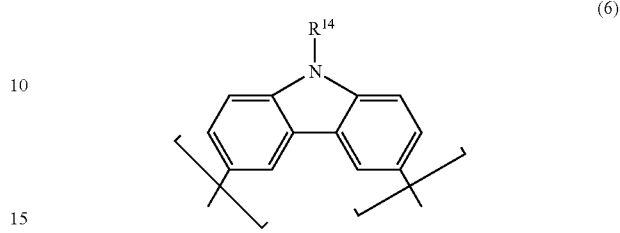

(in the structural formula (6), wherein $R^{14}$ is selected from the group consisting of —$SO_3^-$, —$SO_3H$, —$R^{42}SO_3^-$, —$R^{42}SO_3H$, —COOH, and —$R^{42}COOH$, where $R^{42}$ represents an alkylene, arylene or aralkylene group having 1 to 24 carbon atoms);

(7)

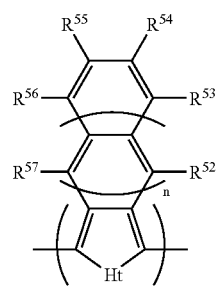

(in the structural formula (7), wherein $R^{52}$ to $R^{57}$ are respectively and independently selected from the group consisting of H, —$SO_3^-$, —$SO_3H$, —$R^{35}SO_3^-$, —$R^{35}SO_3H$, —$OCH_3$, —$CH_3$, —$C_2H_5$, —F, —Cl, —Br, —I, —$N(R^{35})_2$, —NHCOR$^{35}$, —OH, —O$^-$, —SR$^{35}$, —OR$^{35}$, —OCOR$^{35}$, —$NO_2$, —COOH, —$R^{35}$COOH, —COOR$^{35}$, —COR$^{35}$, —CHO, and —CN, where $R^{35}$ represents an alkyl, aryl or aralkyl group having 1 to 24 carbon atoms or an alkylene, arylene or aralkylene group having 1 to 24 carbon atoms, at least one of $R^{52}$ to $R^{57}$ is a group selected from the group consisting of —$SO_3^-$, —$SO_3H$, —$R^{35}SO_3^-$, —$R^{35}SO_3H$, —COOH, and —$R^{35}$COOH, Ht represents a heteroatom group selected from the group consisting of NR$^{82}$, S, O, Se, and Te, where $R^{82}$ represents hydrogen or a linear or branched alkyl group having 1 to 24 carbon atoms or substituted or non-substituted aryl group having 1 to 24 carbon atoms, the hydrocarbon chains of $R^{52}$ to $R^{57}$ mutually bond at arbitrary locations and may form a bivalent chain that forms at least one cyclic structure of saturated or unsaturated hydrocarbons of a 3 to 7-member ring together with the carbon atoms substituted by the groups, the cyclic bonded chain formed in this manner may contain a carbonyl, ether, ester, amide, sulfide, sulfinyl, sulfonyl or imino bond at arbitrary locations, and n represents the number of condensed rings sandwiched between a hetero ring and a benzene ring having substituents $R^{53}$ to $R^{56}$, and is 0 or an integer of 1 to 3);

(8)

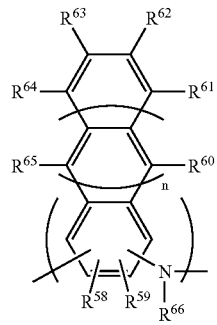

(in the structural formula (8), wherein $R^{58}$ to $R^{66}$ are respectively and independently selected from the group consisting of H, $-SO_3^-$, $-SO_3H$, $-R^{35}SO_3^-$, $-R^{35}SO_3H$, $-OCH_3$, $-CH_3$, $-C_2H_5$, $-F$, $-Cl$, $-Br$, $-I$, $-N(R^{35})_2$, $-NHCOR^{35}$, $-OH$, $-O^-$, $-SR^{35}$, $-OR^{35}$, $-OCOR^{35}$, $-NO_2$, $-COOH$, $-R^{35}COOH$, $-COOR^{35}$, $-COR^{35}$, $-CHO$, and $-CN$, where $R^{35}$ represents an alkyl, aryl or aralkyl group having 1 to 24 carbon atoms or an alkylene, arylene or aralkylene group having 1 to 24 carbon atoms, at least one of $R^{58}$ to $R^{66}$ is a group selected from the group consisting of $-SO_3^-$, $-SO_3H$, $-R^{35}SO_3^-$, $-R^{35}SO_3H$, $-COOH$, and $-R^{35}COOH$, and n represents the number of condensed rings sandwiched between a benzene ring having substituents $R^{58}$ and $R^{59}$ and a benzene ring having substituents $R^{61}$ to $R^{64}$, and is 0 or an integer of 1 to 3);

(9)

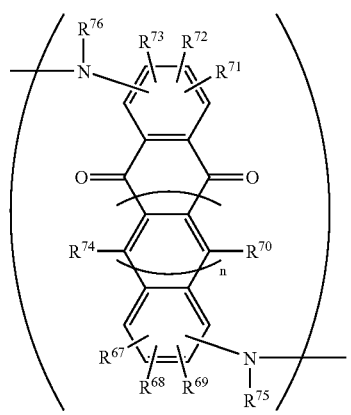

(in the structural formula (9), wherein $R^{67}$ to $R^{76}$ are respectively and independently selected from the group consisting of H, $-SO_3^-$, $-SO_3H$, $-R^{35}SO_3^-$, $-R^{35}SO_3H$, $-OCH_3$, $-CH_3$, $-C_2H_5$, $-F$, $-Cl$, $-Br$, $-I$, $-N(R^{35})_2$, $-NHCOR^{35}$, $-OH$, $-O^-$, $-SR^{35}$, $-OR^{35}$, $-OCOR^{35}$, $-NO_2$, $-COOH$, $-R^{35}COOH$, $-COOR^{35}$, $-COR^{35}$, $-CHO$, and $-CN$, where $R^{35}$ represents an alkyl, aryl or aralkyl group having 1 to 24 carbon atoms or an alkylene, arylene or aralkylene group having 1 to 24 carbon atoms, at least one of $R^{67}$ to $R^{76}$ is a group selected from the group consisting of $-SO_3^-$, $-SO_3H$, $-R^{35}SO_3^-$, $-R^{35}SO_3H$, $-COOH$, and $-R^{35}COOH$, and n represents the number of condensed rings sandwiched between a benzene ring having substituents $R^{67}$ to $R^{69}$ and a benzoquinone ring, and is 0 or an integer of 1 to 3); and, (10)

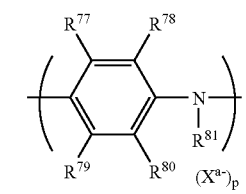

(in the structural formula (10), wherein $R^{77}$ to $R^{81}$ are respectively and independently selected from the group consisting of H, $-SO_3^-$, $-SO_3H$, $-R^{35}SO_3^-$, $-R^{35}SO_3H$, $-OCH_3$, $-CH_3$, $-C_2H_5$, $-F$, $-Cl$, $-Br$, $-I$, $-N(R^{35})_2$, $-NHCOR^{35}$, $-OH$, $-O^-$, $-SR^{35}$, $-OR^{35}$, $-OR^{35}$, $-OCOR^{35}$, $-NO_2$, $-COOH$, $-R^{35}COOH$, $-COOR^{35}$, $-COR^{35}$, $-CHO$, and $-CN$, where $R^{35}$ represents an alkyl, aryl or aralkyl group having 1 to 24 carbon atoms or an alkylene, arylene or aralkylene group having 1 to 24 carbon atoms, at least one of $R^{77}$ to $R^{81}$ is a group selected from the group consisting of $-SO_3^-$, $-SO_3H$, $-R^{35}SO_3^-$, $-R^{35}SO_3H$, $-COOH$, and $-R^{35}COOH$, $X^{a-}$ is at least one type of anion selected from the group of anions having a valence of 1 to 3 consisting of a chlorine ion, bromine ion, iodine ion, fluorine ion, nitrate ion, sulfate ion, hydrogensulfate ion, phosphate ion, borofluoride ion, perchlorate ion, thiocyanate ion, acetate ion, propionate ion, methane sulfonate ion, p toluene sulfonate ion, trifluoroacetate ion, and trifluoromethane sulfonate ion, a represents the ion valence of X and is an integer of 1 to 3, and p represents the doping ratio and has a value of 0.001 to 1).

In addition, polyethylene dioxythiophene polystyrene sulfate is also used as a preferable water soluble conducting polymer having at least one of a sulfonic acid group and a carboxyl group. Although this water soluble conducting polymer does not have any sulfonic acid groups introduced into the backbone of the conducting polymer, it has a structure in which polystyrene sulfonate is added as a dopant. This polymer can be produced by polymerizing 3,4-ethylene dioxythiophene (Bayer, Baytron M) with an oxidizing agent such as iron toluene sulfonate (Bayer, Baytron C). In addition, this polymer can also be acquired in the form of Baytron P (Bayer).

An even more preferable water soluble conducting polymer having at least one of a sulfonic acid group and a carboxyl group is a water soluble conducting polymer that contains 20 to 100% of the repeating unit represented by the following formula (11) relative to the total number of repeating units throughout the entire polymer:

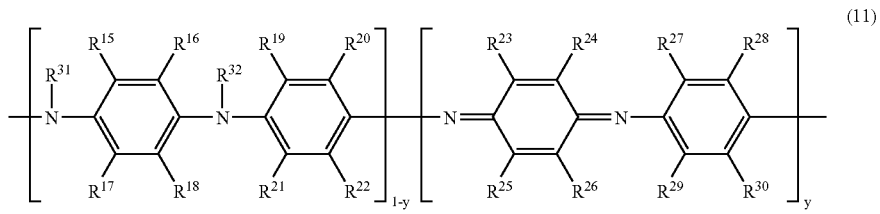

(11)

(in the structural formula (11), wherein y represents an arbitrary number such that $0<y<1$, $R^{15}$ to $R^{32}$ are respectively and independently selected from the group consisting of H, $-SO_3^-$, $-SO_3H$, $-R^{35}SO_3^-$, $-R^{35}SO_3H$, $-OCH_3$, $-CH_3$, $-C_2H_5$, $-F$, $-Cl$, $-Br$, $-I$, $-N(R^{35})_2$, $-NHCOR^{35}$, $-OH$, $-O^-$, $-SR^{35}$, $-OR^{35}$, $-OCOR^{35}$, $-NO_2$, $-COOH$, $-R^{35}COOH$, $-COOR^{35}$, $-COR^{35}$, $-CHO$, and $-CN$, where $R^{35}$ represents an alkyl, aryl or aralkyl group having 1 to 24 carbon atoms or an alkylene, arylene or aralkylene group having 1 to 24 carbon atoms, and at least one of $R^{15}$ to $R^{32}$ is a group selected from the group consisting of $-SO_3^-$, $-SO_3H$, $-R^{35}SO_3^-$, $-R^{35}SO_3H$, $-COOH$ and $-R^{35}COOH$).

Here, a water soluble conducting polymer in which the content of repeating units having at least one of a sulfonic acid group and a carboxyl group is 50% or more relative to the total number of repeating units of the polymer is used preferably since it has extremely favorable solubility in solvents such as water and water-containing organic solvents. The content of repeating units having at least one of a sulfonic acid group and a carboxyl group is more preferably 70% or more, even more preferably 90% or more, and particularly preferably 100%.

In addition, a substituent added to the aromatic ring is preferably an alkyl group, alkoxy group or halogen group, from the perspective of electrical conductivity and solubility, and water soluble conducting polymers having an alkoxy group are the most preferable. The most preferable water soluble conducting polymer among these combinations is shown in the following formula (12):

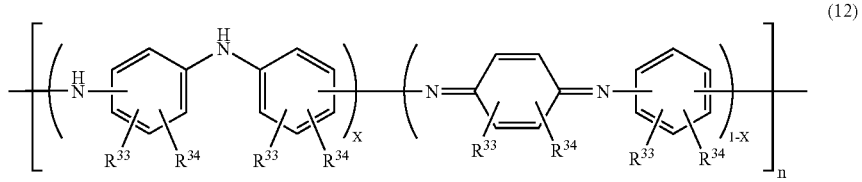

(12)

(in the structural formula (12), wherein $R^{33}$ represents one group selected from the group consisting of a sulfonic acid group, carboxyl group, their alkaline metal salts, ammonium salts and substituted ammonium salts, $R^{34}$ represents one group selected from the group consisting of a methyl group, ethyl group, n-propyl group, iso-propyl group, n-butyl group, iso-butyl group, sec-butyl group, tert-butyl group, dodecyl group, tetracosyl group, methoxy group, ethoxy group, n-propoxy group, iso-butoxy group, sec-butoxy group, tert-butoxy group, heptoxy group, hexoxy group, octoxy group, dodecoxy group, tetracoxy group, fluoro group, chloro group and bromo group, X represents an arbitrary number such that $0<X<1$, and n represents the degree of polymerization and has a value of 3 or more).

Here, at least a portion of $R^{33}$ is preferably at least one of a sulfonic acid group and a carboxyl group of a free acid from the perspective of improving electrical conductivity.

Polymers obtained by various types of synthesis methods such as chemical polymerization or electrolytic polymerization can be used for a water soluble conducting polymer in the present invention. For example, synthesis methods described in Japanese Unexamined Patent Application, First Publication No. H7-196791 and Japanese Unexamined Patent Application, First Publication No. H7-324132 proposed by the inventors of the present invention can be applied. Namely, this refers to water soluble conducting polymers obtained by polymerizing at least one of the acidic group-substituted aniline represented by the following formula (13), its alkaline metal salt, ammonium salt and substituted ammonium salt, with an oxidizing agent in a solution containing a basic compound:

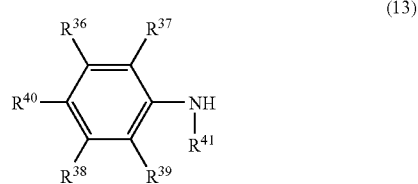

(13)

(in the structural formula (13), wherein $R^{36}$ to $R^{41}$ are respectively and independently selected from the group consisting of H, $-SO_3^-$, $-SO_3H$, $-R^{35}SO_3^-$, $-R^{35}SO_3H$, $-OCH_3$, $-CH_3$, $-C_2H_5$, $-F$, $-Cl$, $-Br$, $-I$, $-N(R^{35})_2$, $-NHCOR^{35}$, $-OH$, $-O^-$, $-SR^{35}$, $-OR^{35}$, $-OCOR^{35}$, $-NO_2$, $-COOH$, $-R^{35}COOH$, $-COOR^{35}$, $-COR^{35}$, $-CHO$, and $-CN$, where $R^{35}$ represents an alkyl, aryl or aralkyl group having 1 to 24 carbon atoms or an alkylene, arylene or aralkylene group having 1 to 24 carbon atoms, and at least one of $R^{36}$ to R is a group selected from the group consisting of $-SO_3^-$, $-SO_3H$, $-R^{35}SO_3^-$, $-R^{35}SO_3H$, $-COOH$ and $-R^{35}COOH$).

A particularly preferable water soluble conducting polymer is a water soluble conducting polymer obtained by polymerizing at least one type of alkoxy group-substituted aminobenzene sulfonic acid, its alkaline metal salt, ammonium salt and substituted ammonium salt, with an oxidizing agent in a solution containing a basic compound.

At least a portion of the acidic groups contained in a water soluble conducting polymer in the present invention are preferably in the form of free acid from the viewpoint of improving electrical conductivity. In addition, a water soluble conducting polymer in the present invention having a mass average molecular weight as GPC polyethylene of 2,000 to 3,000,000 is used preferably due to its superior electrical conductivity, film formability and film strength, while that having a mass average molecular weight of 3,000 to 1,000,000 is more preferable, and that having a mass average molecular weight of 5,000 to 500,000 is the most preferable.

Although the conducting polymer (a) can be used as is, the conducting polymer (a) to which an external dopant has been imparted by doping treatment using acid according to known methods can also be used. Doping treatment can be carried out by, for example, immersing a conductor containing conducting polymer (a) in an acidic solution. Specific examples of acidic solutions used in doping treatment include aqueous solutions containing inorganic acids such as hydrochloric acid, sulfuric acid and nitric acid; organic acids such as p-toluene sulfonic acid, camphasulfonic acid, benzoic acid and derivatives having these backbones; and high molecular weight acids such as polystyrene sulfonic acid, polyvinyl sulfonic acid, poly(2-acrylamide-2-methylpropane) sulfonic acid, polyvinyl sulfuric acid and derivatives having these backbones; or mixed solutions of water and an organic solvent. These inorganic acids, organic acids and high molecular weight acids may each be used alone or they may be used as a mixture of two or more types at an arbitrary ratio.

<Heterocyclic Compound Trimer (i)>

An example of heterocyclic compound trimer (i) is the asymmetrical heterocyclic compound trimer represented by formula (16) in which heterocyclic compounds are bonded asymmetrically:

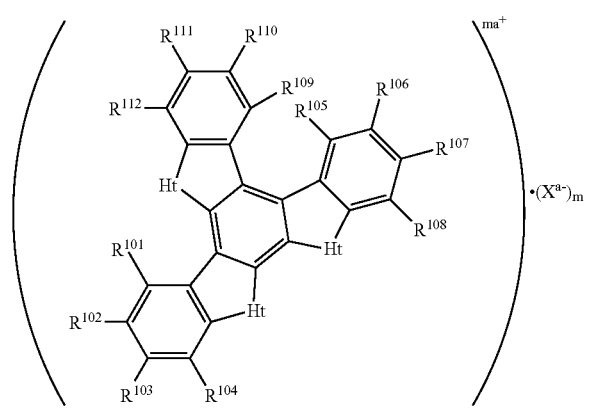

(16)

(in the structural formula (16), wherein $R^{101}$ to $R^{112}$ are substituents respectively and independently selected from the group consisting of hydrogen, a linear or branched alkyl group having 1 to 24 carbon atoms, linear or branched alkoxy group having 1 to 24 carbon atoms, linear or branched acyl group having 2 to 24 carbon atoms, aldehyde group, carboxyl group, linear or branched carboxylic ester group having 2 to 24 carbon atoms, sulfonic acid group, linear or branched sulfonic ester group having 1 to 24 carbon atoms, cyano group, hydroxyl group, nitro group, amino group, amido group, dicyanovinyl group, alkyl (linear or branched alkyl group having 1 to 8 carbon atoms) oxycarbonylcyanovinyl group, nitrophenylcyanovinyl group and halogen group;

Ht represents a heteroatom group selected from the group consisting of $NR^{154}$, S, O, Se and Te, and $R^{154}$ represents a substituent selected from the group consisting of hydrogen and a linear or branched alkyl group having 1 to 24 carbon atoms;

$X^{a-}$ represents at least one type of anion selected from the group consisting of anions having a valence of 1 to 3 consisting of a chlorine ion, bromine ion, iodine ion, fluorine ion, nitrate ion, sulfate ion, hydrogen sulfate ion, phosphate ion, borofluoride ion, perchlorate ion, thiocyanate ion, acetate ion, propionate ion, methane sulfonate ion, p-toluene sulfonate ion, trifluoroacetate ion and trifluoromethane sulfonate ion; a represents the ion valence of X and is an integer of 1 to 3; and m represents the doping ratio and has a value of 0 to 3.0).

Heterocyclic compound trimer (i) is preferably a heterocyclic compound trimer represented by formula (17):

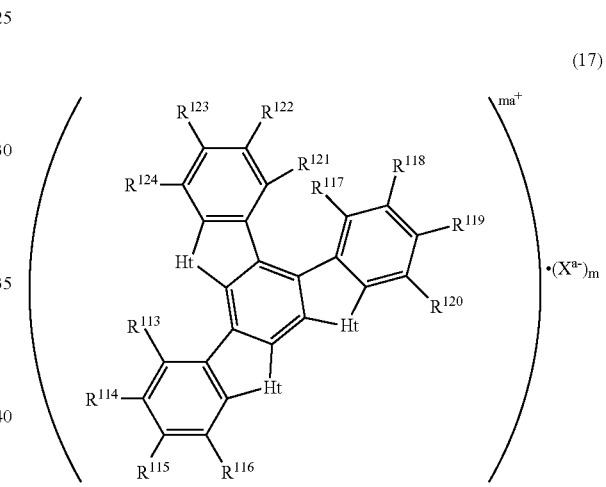

(17)

(in the structural formula (17), wherein $R^{113}$ to $R^{124}$ represent substituents respectively and independently selected from the group consisting of hydrogen, a linear or branched alkyl group having 1 to 24 carbon atoms, linear or branched alkoxy group having 1 to 24 carbon atoms, linear or branched acyl group having 2 to 24 carbon atoms, aldehyde group, carboxyl group, linear or branched carboxylic ester group having 2 to 24 carbon atoms, sulfonic acid group, linear or branched sulfonic ester group having 1 to 24 carbon atoms, cyano group, hydroxyl group, nitro group, amino group, amido group, dicyanovinyl group, alkyl (linear or branched alkyl group having 1 to 8 carbon atoms) oxycarbonylcyanovinyl group, nitrophenylcyanovinyl group and halogen group; at least one of $R^{113}$ to $R^{124}$ is a cyano group, nitro group, amide group, halogen group, sulfonic acid group, and carboxyl group;

Ht represents a heteroatom group selected from the group consisting of $NR^{154}$, S, O, Se and Te, and $R^{154}$ represents a substituent selected from the group consisting of hydrogen and a linear or branched alkyl group having 1 to 24 carbon atoms;

$X^{a-}$ represents at least one type of anion selected from the group consisting of anions having a valence of 1 to 3 consisting of a chlorine ion, bromine ion, iodine ion, fluorine ion, nitrate ion, sulfate ion, hydrogen sulfate ion, phosphate ion, borofluoride ion, perchlorate ion, thiocyanate ion, acetate ion, propionate ion, methanesulfonate ion, p-toluene sulfonate ion, trifluoroacetate ion and trifluoromethane sulfonate ion; a represents the ion valence of X and is an integer of 1 to 3; and m represents the doping ratio and has a value of 0 to 3.0).

In addition, an example of an asymmetrical heterocyclic compound trimer (i) is the indole derivative trimer oxidant represented by general formula (18):

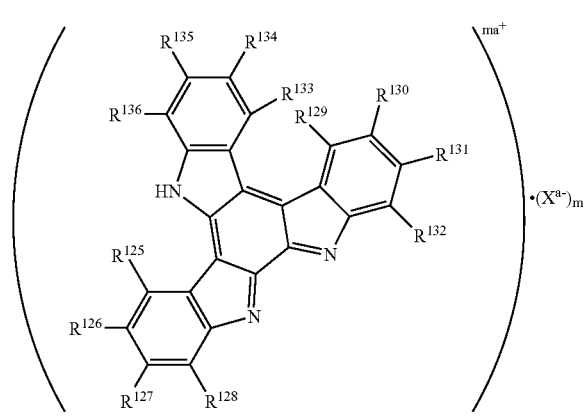

(18)

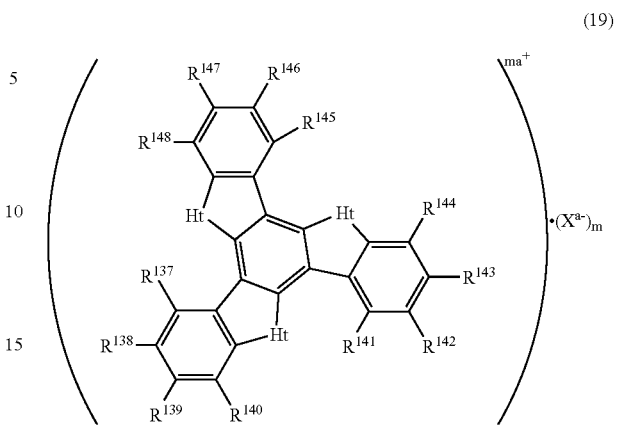

(19)

(in the structural formula (18), wherein $R^{125}$ to $R^{136}$ are substituents respectively and independently selected from the group consisting of hydrogen, a linear or branched alkyl group having 1 to 24 carbon atoms, linear or branched alkoxy group having 1 to 24 carbon atoms, linear or branched acyl group having 2 to 24 carbon atoms, aldehyde group, carboxylic acid group and its alkaline metal salt, ammonium salt and substituted ammonium salt, linear or branched carboxylic ester group having 2 to 24 carbon atoms, sulfonic acid group and its alkaline metal salt, ammonium salt and substituted ammonium salt, linear or branched sulfonic ester group having 1 to 24 carbon atoms, cyano group, hydroxyl group, nitro group, amino group, amido group, dicyanovinyl group, alkyl (linear or branched alkyl group having 1 to 8 carbon atoms) oxycarbonylcyanovinyl group, nitrophenylcyanovinyl group and halogen group;

$X^{a-}$ represents at least one type of anion selected from the group consisting of anions having a valence of 1 to 3 consisting of a chlorine ion, bromine ion, iodine ion, fluorine ion, nitrate ion, sulfate ion, hydrogensulfate ion, phosphate ion, borofluoride ion, perchlorate ion, thiocyanate ion, acetate ion, propionate ion, methanesulfonate ion, p-toluene sulfonate ion, trifluoroacetate ion and trifluoromethane sulfonate ion; a represents the ion valence of X and is an integer of 1 to 3; and m represents the doping ratio and has a value of 0 to 3.0).

On the other hand, an example of heterocyclic compound trimer (i) used in the present invention is a symmetrical heterocyclic compound trimer represented by general formula (19) in which heterocyclic compounds are bonded symmetrically:

(in the structural formula (19), wherein $R^{137}$ to $R^{148}$ are substituents respectively and independently selected from the group consisting of hydrogen, a linear or branched alkyl group having 1 to 24 carbon atoms, linear or branched alkoxy group having 1 to 24 carbon atoms, linear or branched acyl group having 2 to 24 carbon atoms, aldehyde group, carboxyl group, linear or branched carboxylic ester group having 2 to 24 carbon atoms, sulfonic acid group, linear or branched sulfonic ester group having 1 to 24 carbon atoms, cyano group, hydroxyl group, nitro group, amino group, amido group, dicyanovinyl group, alkyl (linear or branched alkyl group having 1 to 8 carbon atoms) oxycarbonylcyanovinyl group, nitrophenylcyanovinyl group and halogen group;

Ht represents a heteroatom group selected from the group consisting of $NR^{154}$, S, O, Se and Te, and $R^{154}$ represents a substituent selected from the group consisting of hydrogen and a linear or branched alkyl group having 1 to 24 carbon atoms;

$X^{a-}$ represents at least one type of anion selected from the group consisting of anions having a valence of 1 to 3 consisting of a chlorine ion, bromine ion, iodine ion, fluorine ion, nitrate ion, sulfate ion, hydrogensulfate ion, phosphate ion, borofluoride ion, perchlorate ion, thiocyanate ion, acetate ion, propionate ion, methanesulfonate ion, p-toluene sulfonate ion, trifluoroacetate ion and trifluoromethane sulfonate ion; a represents the ion valence of X and is an integer of 1 to 3; and m represents the doping ratio and has a value of 0 to 3.0).

Among these heterocyclic compound trimers (i), carboxyl group-substituted heterocyclic compound trimers, sulfonic acid group-substituted heterocyclic compound trimers, cyano group-substituted heterocyclic compound trimers, nitro group-substituted heterocyclic compound trimers, amido group-substituted heterocyclic compound trimers, and halogen group-substituted heterocyclic compound trimers are preferable in terms of practical use. In particular, trimers having an acidic group such as carboxyl group-substituted heterocyclic compound trimers, and sulfonic acid group-substituted heterocyclic compound trimers can be used preferably in terms of safety with respect to people and the environment since water can be used for the solvent due to their water solubility.

In addition, among these heterocyclic compound trimers (i), an indole derivative trimer in which the heterocyclic compound is an indole derivative (namely, a compound in which Ht is represented by $NR^{154}$) is used particularly preferably due to its high electrical conductivity and high solubility.

Heterocyclic compound trimers (i) obtained by various synthesis methods such as chemical synthesis and electrochemical synthesis can be used for a heterocyclic compound trimer (i) used in the present invention.

In the present invention, a heterocyclic compound trimer obtained by reacting at least one type of heterocyclic compound represented by the following general formula (20) in a reaction mixture containing at least one type of oxidizing agent and at least one type of solvent is used particularly preferably due to its high electrical conductivity and high solubility.

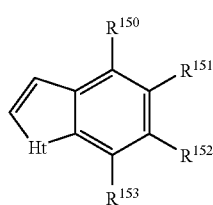

(20)

(in the formula (20), wherein $R^{150}$ to $R^{153}$ are substituents respectively and independently selected from the group consisting of hydrogen, a linear or branched alkyl group having 1 to 24 carbon atoms, linear or branched alkoxy group having 1 to 24 carbon atoms, linear or branched acyl group having 2 to 24 carbon atoms, aldehyde group, carboxyl group, linear or branched carboxylic ester group having 2 to 24 carbon atoms, sulfonic acid group, linear or branched sulfonic ester group having 1 to 24 carbon atoms, cyano group, hydroxyl group, nitro group, amino group, amido group, dicyanovinyl group, alkyl (linear or branched alkyl group having 1 to 8 carbon atoms) oxycarbonylcyanovinyl group, nitrophenylcyanovinyl group and halogen group; and, Ht represents a heteroatom group selected from the group consisting of $NR^{154}$, S, O, Se and Te, and $R^{154}$ represents a substituent selected from the group consisting of hydrogen and a linear or branched alkyl group having 1 to 24 carbon atoms).

Specific examples of the most typical indole derivatives represented by general formula (20) used in the synthesis method of the heterocyclic compound trimer (i) include carboxyl group-substituted indoles, their alkaline metal salts, ammonium salts and substituted ammonium salts such as indole-4-carboxylic acid, indole-5-carboxylic acid, indole-6-carboxylic acid and indole-7-carboxylic acid; sulfonic acid group-substituted indoles, their alkaline metal salts, ammonium salts and substituted ammonium salts such as indole-4-sulfonic acid, indole-5-sulfonic acid, indole-6-sulfonic acid and indole-7-sulfonic acid; alkyl group-substituted indoles such as 4-methylindole, 5-methylindole, 6-methylindole, 7-methylindole, 4-ethylindole, 5-ethylindole, 6-ethylindole, 7-ethylindole, 4-n-propylindole, 5-n-propylindole, 6-n-propylindole, 7-n-propylindole, 4-iso-propylindole, 5-iso-propylindole, 6-iso-propylindole, 7-iso-propylindole, 4-n-butylindole, 5-n-butylindole, 6-n-butylindole, 7-n-butylindole, 4-sec-butylindole, 5-sec-butylindole, 6-sec-butylindole, 7-sec-butylindole, 4-t-butylindole, 5-t-butylindole, 6-t-butylindole and 7-t-butylindole; alkoxy group-substituted indoles such as 4-methoxyindole, 5-methoxyindole, 6-methoxyindole, 7-methoxyindole, 4-ethoxyindole, 5-ethoxyindole, 6-ethoxyindole, 7-ethoxyindole, 4-n-propoxyindole, 5-n-propoxyindole, 6-n-propoxyindole, 7-n-propoxyindole, 4-iso-propoxyindole, 5-iso-propoxyindole, 6-iso-propoxyindole, 7-iso-propoxyindole, 4-n-butoxyindole, 5-n-butoxyindole, 6-n-butoxyindole, 7-n-butoxyindole, 4-sec-butoxyindole, 5-sec-butoxyindole, 6-sec-butoxyindole, 7-sec-butoxyindole, 4-t-butoxyindole, 5-t-butoxyindole, 6-t-butoxyindole and 7-t-butoxyindole; acyl group-substituted indoles such as 4-acetylindole, 5-acetylindole, 6-acetylindole and 7-acetylindole; aldehyde group-substituted indoles such as indole-4-carbaldehyde, indole-5-carbaldehyde, indole-6-carbaldehyde and indole-7-carbaldehyde; carboxylic ester group-substituted indoles such as methyl indole-4-carboxylate, methyl indole-5-carboxylate, methyl indole-6-carboxylate and methyl indole-7-carboxylate; sulfonic ester group-substituted indoles such as methyl indole-4-sulfonate, methyl indole-5-sulfonate, methyl indole-6-sulfonate and methyl indole-7-sulfonate; cyano group-substituted indoles such as indole-4-carbonitrile, indole-5-carbonitrile, indole-6-carbonitrile and indole-7-carbonitrile; hydroxyl group-substituted indoles such as 4-hydroxyindole, 5-hydroxyindole, 6-hydroxyindole and 7-hydroxyindole; nitro group-substituted indoles such as 4-nitroindole, 5-nitroindole, 6-nitroindole and 7-nitroindole; amino group-substituted indoles such as 4-aminoindole, 5-aminoindole, 6-aminoindole and 7-aminoindole; amido group-substituted indoles such as 4-carbamoylindole, 5-carbamoylindole, 6-carbamoylindole and 7-carbamoylindole; halogen group-substituted indoles such as 4-fluoroindole, 5-fluoroindole, 6-fluoroindole, 7-fluoroindole, 4-chloroindole, 5-chloroindole, 6-chloroindole, 7-chloroindole, 4-bromoindole, 5-bromoindole, 6-bromoindole, 7-bromoindole, 4-iodoindole, 5-iodoindole, 6-iodoindole and 7-iodoindole; dicyanovinyl group-substituted indoles such as 4-dicyanovinylindole, 5-dicyanovinylindole, 6-dicyanovinylindole and 7-dicyanovinylindole; and N-alkyl group-substituted indoles such as N-methylindole, N-ethylindole, N-n-propylindole, N-iso-propylindole, N-n-butylindole, N-sec-butylindole and N-t-butylindole.

Specific examples of the most typical benzo[b]furans represented by general formula (20) include carboxyl group-substituted benzo[b]furans, their alkaline metal salts, ammonium salts and substituted ammonium salts such as benzo[b]furan-4-carboxylic acid, benzo[b]furan-5-carboxylic acid, benzo[b]furan-6-carboxylic acid and benzo[b]furan-7-carboxylic acid; sulfonic acid group-substituted benzo[b]furans, their alkaline metal salts, ammonium salts and substituted ammonium salts such as benzo[b]furan-4-sulfonic acid, benzo[b]furan-5-sulfonic acid, benzo[b]furan-6-sulfonic acid and benzo[b]furan-7-sulfonic acid; alkyl group-substituted benzo[b]furans such as 4-methylbenzo[b]furan, 5-methylbenzo[b]furan, 6-methylbenzo[b]furan, 7-methylbenzo[b]furan, 4-ethylbenzo[b]furan, 5-ethylbenzo[b]furan, 6-ethylbenzo[b]furan, 7-ethylbenzo[b]furan, 4-n-propylbenzo[b]furan, 5-n-propylbenzo[b]furan, 6-n-propylbenzo[b]furan, 7-n-propylbenzo[b]furan, 4-iso-propylbenzo[b]furan, 5-iso-propylbenzo[b]furan, 6-iso-propylbenzo[b]furan, 7-iso-propylbenzo[b]furan, 4-n-butylbenzo[b]furan, 5-n-butylbenzo[b]furan, 6-n-butylbenzo[b]furan, 7-n-butylbenzo[b]furan, 4-sec-butylbenzo[b]furan, 5-sec-butylbenzo[b]furan, 6-sec-butylbenzo[b]furan, 7-sec-butylbenzo[b]furan, 4-t-butylbenzo[b]furan, 5-t-butylbenzo[b]furan, 6-t-butylbenzo[b]furan and 7-t-butylbenzo[b]furan; alkoxy group-substituted benzo[b]furans such as 4-methoxybenzo[b]furan, 5-methoxybenzo[b]furan, 6-methoxybenzo[b]furan, 7-methoxybenzo[b]furan, 4-ethoxybenzo[b]furan, 5-ethoxybenzo[b]furan, 6-ethoxybenzo[b]furan, 7-ethoxybenzo[b]furan, 4-n-propoxybenzo[b]furan, 5-n-propoxybenzo[b]furan, 6-n-propoxybenzo[b]furan, 7-n-propoxybenzo[b]furan, 4-iso-propoxybenzo[b]furan, 5-iso-propoxybenzo[b]furan, 6-iso-propoxybenzo[b]furan, 7-iso-propoxybenzo[b]furan, 4-n-butoxybenzo[b]furan, 5-n-butoxybenzo[b]furan, 6-n- butoxybenzo[b]furan, 7-n-butoxybenzo[b]furan, 4-sec-butoxybenzo[b]furan, 5-sec-butoxybenzo[b]furan, 6-sec-butoxybenzo[b]furan, 7-sec-butoxybenzo[b]furan, 4-t-butyoxybenzo[b]furan, 5-t-butoxybenzo[b]furan, 6-t-butoxybenzo[b]furan and 7-t-butoxybenzo[b]furan; acyl group-substituted benzo[b]furans such as 4-acetylbenzo[b]furan, 5-acetylbenzo[b]furan, 6-acetylbenzo[b]furan and 7-acetylbenzo[b]furan; aldehyde group-substituted benzo[b]furans such as benzo[b]furan 4-carbaldehyde, benzo[b]furan 5-carbaldehyde, benzo[b]furan 6-carbaldehyde and benzo[b]furan 7-carbaldehyde; carboxylic ester-group substituted benzo[b]furans such as methyl benzo[b]furan-4-carboxylate, methyl benzo[b]furan-5-carboxylate, methyl benzo[b]furan-6-carboxylate and methyl benzo[b]furan-7-carboxylate; sulfonic ester-group substituted benzo[b]furans such as methyl benzo[b]furan-4-sulfonate, methyl benzo[b]furan-5-sulfonate, methyl benzo[b]furan-6-sulfonate and methyl benzo[b]furan-7-sulfonate; cyano group-substituted benzo[b]furans such as benzo[b]furan-4-carbonitrile, benzo[b]furan-5-carbonitrile, benzo[b]furan-6-carbonitrile and benzo[b]furan-7-carbonitrile; hydroxyl group-substituted benzo[b]furans such as 4-hydroxybenzo[b]furan, 5-hydroxybenzo[b]furan, 6-hydroxybenzo[b]furan and 7-hydroxybenzo[b]furan; nitro group-substituted benzo[b]furans such as 4-nitrobenzo[b]furan, 5-nitrobenzo[b]furan, 6-nitrobenzo[b]furan and 7-nitrobenzo[b]furan; amino group-substituted benzo[b]furans such as 4-aminobenzo[b]furan, 5-aminobenzo[b]furan, 6-aminobenzo[b]furan and 7-aminobenzo[b]furan; amido group-substituted benzo[b]furans such as 4-carbamoylbenzo[b]furan, 5-carbamoylbenzo[b]furan, 6-carbamoylbenzo[b]furan and 7-carbamoylbenzo[b]furan; halogen group-substituted benzo[b]furans such as 4-fluorobenzo[b]furan, 5-fluorobenzo[b]furan, 6-fluorobenzo[b]furan, 7-fluorobenzo[b]furan, 4-chlorobenzo[b]furan, 5-chlorobenzo[b]furan, 6-chlorobenzo[b]furan, 7-chlorobenzo[b]furan, 4-bromobenzo[b]furan, 5-bromobenzo[b]furan, 6-bromobenzo[b]furan, 7-bromobenzo[b]furan, 4-iodobenzo[b]furan, 5-iodobenzo[b]furan, 6-iodobenzo[b]furan and 7-iodobenzo[b]furan; dicyanovinyl group-substituted benzo[b]furans such as 4-dicyanovinylbenzo[b]furan, 5-dicyanovinylbenzo[b]furan, 6-dicyanovinylbenzo[b]furan and 7-dicyanovinylbenzo[b]furan; and N-alkyl group-substituted benzo[b]furans such as N-methylbenzo[b]furan, N-ethylbenzo[b]furan, N-n-propylbenzo[b]furan, N-iso-propylbenzo[b]furan, N-n-butylbenzo[b]furan, N-sec-butylbenzo[b]furan and N-t-butylbenzo[b]furan.

Specific examples of the most typical benzo[b]thiophenes represented by general formula (20) include carboxyl group-substituted benzo[b]thiophenes, their alkaline metal salts, ammonium salts and substituted ammonium salts such as benzo[b]thiophene-4-carboxylic acid, benzo[b]thiophene-5-carboxylic acid, benzo[b]thiophene-6-carboxylic acid and benzo[b]thiophene-7-carboxylic acid; sulfonic acid group-substituted benzo[b]thiophenes, their alkaline metal salts, ammonium salts and substituted ammonium salts such as benzo[b]thiophene-4-sulfonic acid, benzo[b]thiophene-5-sulfonic acid, benzo[b]thiophene-6-sulfonic acid and benzo[b]thiophene-7-sulfonic acid; alkyl group-substituted benzo[b]thiophenes such as 4-methylbenzo[b]thiophene, 5-methylbenzo[b]thiophene, 6-methylbenzo[b]thiophene, 7-methylbenzo[b]thiophene, 4-ethylbenzo[b]thiophene, 5-ethylbenzo[b]thiophene, 6-ethylbenzo[b]thiophene, 7-ethylbenzo[b]thiophene, 4-n-propylbenzo[b]thiophene, 5-n-propylbenzo[b]thiophene, 6-n-propylbenzo[b]thiophene, 7-n-propylbenzo[b]thiophene, 4-iso-propylbenzo[b]thiophene, 5-iso-propylbenzo[b]thiophene, 6-iso-propylbenzo[b]thiophene, 7-iso-propylbenzo[b]thiophene, 4-n-butylbenzo[b]thiophene, 5-n-butylbenzo[b]thiophene, 6-n-butylbenzo[b]thiophene, 7-n-butylbenzo[b]thiophene, 4-sec-butylbenzo[b]thiophene, 5-sec-butylbenzo[b]thiophene, 6-sec-butylbenzo[b]thiophene, 7-sec-butylbenzo[b]thiophene, 4-t-butylbenzo[b]thiophene, 5-t-butylbenzo[b]thiophene, 6-t-butylbenzo[b]thiophene and 7-t-butylbenzo[b]thiophene; alkoxy group-substituted benzo[b]thiophenes such as 4-methoxybenzo[b]thiophene, 5-methoxybenzo[b]thiophene, 6-methoxybenzo[b]thiophene, 7-methoxybenzo[b]thiophene, 4-ethoxybenzo[b]thiophene, 5-ethoxybenzo[b]thiophene, 6-ethoxybenzo[b]thiophene, 7-ethoxybenzo[b]thiophene, 4-n-propoxybenzo[b]thiophene, 5-n-propoxybenzo[b]thiophene, 6-n-propoxybenzo[b]thiophene, 7-n-propoxybenzo[b]thiophene, 4-iso-propoxybenzo[b]thiophene, 5-iso-propoxybenzo[b]thiophene, 6-iso-propoxybenzo[b]thiophene, 7-iso-propoxybenzo[b]thiophene, 4-n-butoxybenzo[b]thiophene, 5-n-butoxybenzo[b]thiophene, 6-n-butoxybenzo[b]thiophene, 7-n-butoxybenzo[b]thiophene, 4-sec-butoxybenzo[b]thiophene, 5-sec-butoxybenzo[b]thiophene, 6-sec-butoxybenzo[b]thiophene, 7-sec-butoxybenzo[b]thiophene, 4-t-butyoxybenzo[b]thiophene, 5-t-butoxybenzo[b]thiophene, 6-t-butoxybenzo[b]thiophene and 7-t-butoxybenzo[b]thiophene; acyl group-substituted benzo[b]thiophenes such as 4-acetylbenzo[b]thiophene, 5-acetylbenzo[b]thiophene, 6-acetylbenzo[b]thiophene and 7-acetylbenzo[b]thiophene; aldehyde group-substituted benzo[b]thiophenes such as benzo[b]thiophene 4-carbaldehyde, benzo[b]thiophene 5-carbaldehyde, benzo[b]thiophene 6-carbaldehyde and benzo[b]thiophene 7-carbaldehyde; carboxylic ester-group substituted benzo[b]thiophenes such as methyl benzo[b]thiophene-4-carboxylate, methyl benzo[b]thiophene-5-carboxylate, methyl benzo[b]thiophene-6-carboxylate and methyl benzo[b]thiophene-7-carboxylate; sulfonic ester-group substituted benzo[b]thiophenes such as methyl benzo[b]thiophene-4-sulfonate, methyl benzo[b]thiophene-5-sulfonate, methyl benzo[b]thiophene-6-sulfonate and methyl benzo[b]thiophene-7-sulfonate; cyano group-substituted benzo[b]thiophenes such as benzo[b]thiophene-4-carbonitrile, benzo[b]thiophene-5-carbonitrile, benzo[b]thiophene-6-carbonitrile and benzo[b]thiophene-7-carbonitrile; hydroxyl group-substituted benzo[b]thiophenes such as 4-hydroxybenzo[b]thiophene, 5-hydroxybenzo[b]thiophene, 6-hydroxybenzo[b]thiophene and 7-hydroxybenzo[b]thiophene; nitro group-substituted benzo[b]thiophenes such as 4-nitrobenzo[b]thiophene, 5-nitrobenzo[b]thiophene, 6-nitrobenzo[b]thiophene and 7-nitrobenzo[b]thiophene; amino group-substituted benzo[b]thiophenes such as 4-aminobenzo[b]thiophene, 5-aminobenzo[b]thiophene, 6-aminobenzo[b]thiophene and 7-aminobenzo[b]thiophene; amido group-substituted benzo[b]thiophenes such as 4-carbamoylbenzo[b]thiophene, 5-carbamoylbenzo[b]thiophene, 6-carbamoylbenzo[b]thiophene and 7-carbamoylbenzo[b]thiophene; halogen group-substituted benzo[b]thiophenes such as 4-fluorobenzo[b]thiophene, 5-fluorobenzo[b]thiophene, 6-fluorobenzo[b]thiophene, 7-fluorobenzo[b]thiophene, 4-chlorobenzo[b]thiophene, 5-chlorobenzo[b]thiophene, 6-chlorobenzo[b]thiophene, 7-chlorobenzo[b]thiophene, 4-bromobenzo[b]thiophene, 5-bromobenzo[b]thiophene, 6-bromobenzo[b]thiophene, 7-bromobenzo[b]thiophene, 4-iodobenzo[b]thiophene, 5-iodobenzo[b]thiophene, 6-iodobenzo[b]thiophene and 7-iodobenzo[b]thiophene; dicyanovinyl group-substituted benzo[b]thiophenes such as 4-dicyanovinylbenzo[b]thiophene, 5-dicyanovinylbenzo[b]thiophene, 6-dicyanovinylbenzo[b]thiophene and 7-dicyanovinylbenzo[b]thiophene; and, N-alkyl group-substituted benzo[b]thiophenes such as N-methylbenzo[b]thiophene, N-ethylbenzo[b]thiophene, N-n-propylbenzo[b]thiophene, N-iso-propylbenzo[b]thiophene, N-n-butylbenzo[b]thiophene, N-sec-butylbenzo[b]thiophene and N-t-butylbenzo[b]thiophene.

Specific examples of the most typical benzo[b]selenophenes represented by general formula (20) include carboxyl group-substituted benzo[b]selenophenes, their alkaline metal salts, ammonium salts and substituted ammonium salts such as benzo[b]selenophene-4-carboxylic acid, benzo[b]selenophene-5-carboxylic acid, benzo[b]selenophene-6-carboxylic acid and benzo[b]selenophene-7-carboxylic acid; sulfonic acid group-substituted benzo[b]selenophenes, their alkaline metal salts, ammonium salts and substituted ammonium salts such as benzo[b]selenophene-4-sulfonic acid, benzo[b]selenophene-5-sulfonic acid, benzo[b]selenophene-6-sulfonic acid and benzo[b]selenophene-7-sulfonic acid; alkyl group-substituted benzo[b]selenophenes such as 4-methylbenzo[b]selenophene, 5-methylbenzo[b]selenophene, 6-methylbenzo[b]selenophene, 7-methylbenzo[b]selenophene, 4-ethylbenzo[b]selenophene, 5-ethylbenzo[b]selenophene, 6-ethylbenzo[b]selenophene, 7-ethylbenzo[b]selenophene, 4-n-propylbenzo[b]selenophene, 5-n-propylbenzo[b]selenophene, 6-n-propylbenzo[b]selenophene, 7-n-propylbenzo[b]selenophene, 4-iso-propylbenzo[b]selenophene, 5-iso-propylbenzo[b]selenophene, 6-iso-propylbenzo[b]selenophene, 7-iso-propylbenzo[b]selenophene, 4-n-butylbenzo[b]selenophene, 5-n-butylbenzo[b]selenophene, 6-n-butylbenzo[b]selenophene, 7-n-butylbenzo[b]selenophene, 4-sec-butylbenzo[b]selenophene, 5-sec-butylbenzo[b]selenophene, 6-sec-butylbenzo[b]selenophene, 7-sec-butylbenzo[b]selenophene, 4-t-butylbenzo[b]selenophene, 5-t-butylbenzo[b]selenophene, 6-t-butylbenzo[b]selenophene and 7-t-butylbenzo[b]selenophene; alkoxy group-substituted benzo[b]selenophenes such as 4-methoxybenzo[b]selenophene, 5-methoxybenzo[b]selenophene, 6-methoxybenzo[b]selenophene, 7-methoxybenzo[b]selenophene, 4-ethoxybenzo[b]selenophene, 5-ethoxybenzo[b]selenophene, 6-ethoxybenzo[b]selenophene, 7-ethoxybenzo[b]selenophene, 4-n-propoxybenzo[b]selenophene, 5-n-propoxybenzo[b]selenophene, 6-n-propoxybenzo[b]selenophene, 7-n-propoxybenzo[b]selenophene, 4-iso-propoxybenzo[b]selenophene, 5-iso-propoxybenzo[b]selenophene, 6-iso-propoxybenzo[b]selenophene, 7-iso-propoxybenzo[b]selenophene, 4-n-butoxybenzo[b]selenophene, 5-n-butoxybenzo[b]selenophene, 6-n-butoxybenzo[b]selenophene, 7-n-butoxybenzo[b]selenophene, 4-sec-butoxybenzo[b]selenophene, 5-sec-butoxybenzo[b]selenophene, 6-sec-butoxybenzo[b]selenophene, 7-sec-butoxybenzo[b]selenophene, 4-t-butyoxybenzo[b]selenophene, 5-t-butoxybenzo[b]selenophene, 6-t-butoxybenzo[b]selenophene and 7-t-butoxybenzo[b]selenophene; acyl group-substituted benzo[b]selenophenes such as 4-acetylbenzo[b]selenophene, 5-acetylbenzo[b]selenophene, 6-acetylbenzo[b]selenophene and 7-acetylbenzo[b]selenophene; aldehyde group-substituted benzo[b]selenophenes such as benzo[b]selenophene 4-carbaldehyde, benzo[b]selenophene 5-carbaldehyde, benzo[b]selenophene 6-carbaldehyde and benzo[b]selenophene 7-carbaldehyde; carboxylic ester-group substituted benzo[b]selenophenes such as methyl benzo[b]selenophene-4-carboxylate, methyl benzo[b]selenophene-5-carboxylate, methyl benzo[b]selenophene-6-carboxylate and methyl benzo[b]selenophene-7-carboxylate; sulfonic ester-group substituted benzo[b]selenophenes such as methyl benzo[b]selenophene-4-sulfonate, methyl benzo[b]selenophene-5-sulfonate, methyl benzo[b]selenophene-6-sulfonate and methyl benzo[b]selenophene-7-sulfonate; cyano group-substituted benzo[b]selenophenes such as benzo[b]selenophene-4-carbonitrile, benzo[b]selenophene-5-carbonitrile, benzo[b]selenophene-6-carbonitrile and benzo[b]selenophene-7-carbonitrile; hydroxyl group-substituted benzo[b]selenophenes such as 4-hydroxybenzo[b]selenophene, 5-hydroxybenzo[b]selenophene, 6-hydroxybenzo[b]selenophene and 7-hydroxybenzo[b]selenophene; nitro group-substituted benzo[b]selenophenes such as 4-nitrobenzo[b]selenophene, 5-nitrobenzo[b]selenophene, 6-nitrobenzo[b]selenophene and 7-nitrobenzo[b]selenophene; amino group-substituted benzo[b]selenophenes such as 4-aminobenzo[b]selenophene, 5-aminobenzo[b]selenophene, 6-aminobenzo[b]selenophene and 7-aminobenzo[b]selenophene; amido group-substituted benzo[b]selenophenes such as 4-carbamoylbenzo[b]selenophene, 5-carbamoylbenzo[b]selenophene, 6-carbamoylbenzo[b]selenophene and 7-carbamoylbenzo[b]selenophene; halogen group-substituted benzo[b]selenophenes such as 4-fluorobenzo[b]selenophene, 5-fluorobenzo[b]selenophene, 6-fluorobenzo[b]selenophene, 7-fluorobenzo[b]selenophene, 4-chlorobenzo[b]selenophene, 5-chlorobenzo[b]selenophene, 6-chlorobenzo[b]selenophene, 7-chlorobenzo[b]selenophene, 4-bromobenzo[b]selenophene, 5-bromobenzo[b]selenophene, 6-bromobenzo[b]selenophene, 7-bromobenzo[b]selenophene, 4-iodobenzo[b]selenophene, 5-iodobenzo[b]selenophene, 6-iodobenzo[b]selenophene and 7-iodobenzo[b]selenophene; dicyanovinyl group-substituted benzo[b]selenophenes such as 4-dicyanovinylbenzo[b]selenophene, 5-dicyanovinylbenzo[b]selenophene, 6-dicyanovinylbenzo[b]selenophene and 7-dicyanovinylbenzo[b]selenophene; and, N-alkyl group-substituted benzo[b]selenophenes such as N-methylbenzo[b]selenophene, N-ethylbenzo[b]selenophene, N-n-propylbenzo[b]selenophene, N-iso-propylbenzo[b]selenophene, N-n-butylbenzo[b]selenophene, N-sec-butylbenzo[b]selenophene and N-t-butylbenzo[b]selenophene.

Specific examples of the most typical benzo[b]tellurophenes represented by general formula (20) include carboxyl group-substituted benzo[b]tellurophenes, their alkaline metal salts, ammonium salts and substituted ammonium salts such as benzo[b]tellurophene-4-carboxylic acid, benzo[b]tellurophene-5-carboxylic acid, benzo[b]tellurophene-6-carboxylic acid and benzo[b]tellurophene-7-carboxylic acid; sulfonic acid group-substituted benzo[b]tellurophenes, their alkaline metal salts, ammonium salts and substituted ammonium salts such as benzo[b]tellurophene-4-sulfonic acid, benzo[b]tellurophene-5-sulfonic acid, benzo[b]tellurophene-6-sulfonic acid and benzo[b]tellurophene-7-sulfonic acid; alkyl group-substituted benzo[b]tellurophenes such as 4-methylbenzo[b]tellurophene, 5-methylbenzo[b]tellurophene, 6-methylbenzo[b]tellurophene, 7-methylbenzo[b]tellurophene, 4-ethylbenzo[b]tellurophene, 5-ethylbenzo[b]tellurophene, 6-ethylbenzo[b]tellurophene, 7-ethylbenzo[b]tellurophene, 4-n-propylbenzo[b]tellurophene, 5-n-propylbenzo[b]tellurophene, 6-n-propylbenzo[b]tellurophene, 7-n-propylbenzo[b]tellurophene, 4-iso-propylbenzo[b]tellurophene, 5-iso-propylbenzo[b]tellurophene, 6-iso-propylbenzo[b]tellurophene, 7-iso-propylbenzo[b]tellurophene, 4-n-butylbenzo[b]tellurophene, 5-n-butylbenzo[b]tellurophene, 6-n-butylbenzo[b]tellurophene, 7-n-butylbenzo[b]tellurophene, 4-sec-butylbenzo[b]tellurophene, 5-sec-butylbenzo[b]tellurophene, 6-sec-butylbenzo[b]tellurophene, 7-sec-butylbenzo[b]tellurophene, 4-t-butylbenzo[b]tellurophene, 5-t-butylbenzo[b]tellurophene, 6-t-butylbenzo[b]tellurophene and 7-t-butylbenzo[b]tellurophene; alkoxy group-substituted benzo[b]tellurophenes such as 4-methoxybenzo[b]tellurophene, 5-methoxybenzo[b]tellurophene, 6-methoxybenzo[b]tellurophene, 7-methoxybenzo[b]tellurophene, 4-ethoxybenzo[b]tellurophene, 5-ethoxybenzo[b]tellurophene, 6-ethoxybenzo[b]tellurophene, 7-ethoxybenzo[b]tellurophene, 4-n-propoxybenzo[b]tellurophene, 5-n-propoxybenzo[b]tellurophene, 6-n-propoxybenzo[b]tellurophene, 7-n-propoxybenzo[b]tellurophene, 4-iso-propoxybenzo[b]tellurophene, 5-iso-propoxybenzo[b]tellurophene, 6-iso-propoxybenzo[b]tellurophene, 7-iso-propoxybenzo[b]tellurophene, 4-n-butoxybenzo[b]tellurophene, 5-n-butoxybenzo[b]tellurophene, 6-n-butoxybenzo[b]tellurophene, 7-n-butoxybenzo[b]tellurophene, 4-sec-butoxybenzo[b]tellurophene, 5-sec-butoxybenzo[b]tellurophene, 6-sec-butoxybenzo[b]tellurophene, 7-sec-butoxybenzo[b]tellurophene, 4-t-butyoxybenzo[b]tellurophene, 5-t-butoxybenzo[b]tellurophene, 6-t-butoxybenzo[b]tellurophene and 7-t-butoxybenzo[b]tellurophene; acyl group-substituted benzo[b]tellurophenes such as 4-acetylbenzo[b]tellurophene, 5-acetylbenzo[b]tellurophene, 6-acetylbenzo[b]tellurophene and 7-acetylbenzo[b]tellurophene; aldehyde group-substituted benzo[b]tellurophenes such as benzo[b]tellurophene 4-carbaldehyde, benzo[b]tellurophene 5-carbaldehyde, benzo[b]tellurophene 6-carbaldehyde and benzo[b]tellurophene 7-carbaldehyde; carboxylic ester-group substituted benzo[b]tellurophenes such as methyl benzo[b]tellurophene-4-carboxylate, methyl benzo[b]tellurophene-5-carboxylate, methyl benzo[b]tellurophene-6-carboxylate and methyl benzo[b]tellurophene-7-carboxylate; sulfonic ester-group substituted benzo[b]tellurophenes such as methyl benzo[b]tellurophene-4-sulfonate, methyl benzo[b]tellurophene-5-sulfonate, methyl benzo[b]tellurophene-6-sulfonate and methyl benzo[b]tellurophene-7-sulfonate; cyano group-substituted benzo[b]tellurophenes such as benzo[b]tellurophene-4-carbonitrile, benzo[b]tellurophene-5-carbonitrile, benzo[b]tellurophene-6-carbonitrile and benzo[b]tellurophene-7-carbonitrile; hydroxyl group-substituted benzo[b]tellurophenes such as 4-hydroxybenzo[b]tellurophene, 5-hydroxybenzo[b]tellurophene, 6-hydroxybenzo[b]tellurophene and 7-hydroxybenzo[b]tellurophene; nitro group-substituted benzo[b]tellurophenes such as 4-nitrobenzo[b]tellurophene, 5-nitrobenzo[b]tellurophene, 6-nitrobenzo[b]tellurophene and 7-nitrobenzo[b]tellurophene; amino group-substituted benzo[b]tellurophenes such as 4-aminobenzo[b]tellurophene, 5-aminobenzo[b]tellurophene, 6-aminobenzo[b]tellurophene and 7-aminobenzo[b]tellurophene; amido group-substituted benzo[b]tellurophenes such as 4-carbamoylbenzo[b]tellurophene, 5-carbamoylbenzo[b]tellurophene, 6-carbamoylbenzo[b]tellurophene and 7-carbamoylbenzo[b]tellurophene; halogen group-substituted benzo[b]tellurophenes such as 4-fluorobenzo[b]tellurophene, 5-fluorobenzo[b]tellurophene, 6-fluorobenzo[b]tellurophene, 7-fluorobenzo[b]tellurophene, 4-chlorobenzo[b]tellurophene, 5-chlorobenzo[b]tellurophene, 6-chlorobenzo[b]tellurophene, 7-chlorobenzo[b]tellurophene, 4-bromobenzo[b]tellurophene, 5-bromobenzo[b]tellurophene, 6-bromobenzo[b]tellurophene, 7-bromobenzo[b]tellurophene, 4-iodobenzo[b]tellurophene, 5-iodobenzo[b]tellurophene, 6-iodobenzo[b]tellurophene and 7-iodobenzo[b]tellurophene; dicyanovinyl group-substituted benzo[b]tellurophenes such as 4-dicyanovinylbenzo[b]tellurophene, 5-dicyanovinylbenzo[b]tellurophene, 6-dicyanovinylbenzo[b]tellurophene and 7-dicyanovinylbenzo[b]tellurophene; and, N-alkyl group-substituted benzo[b]tellurophenes such as N-methylbenzo[b]tellurophene, N-ethylbenzo[b]tellurophene, N-n-propylbenzo[b]tellurophene, N-iso-propylbenzo[b]tellurophene, N-n-butylbenzo[b]tellurophene, N-sec-butylbenzo[b]tellurophene and N-t-butylbenzo[b]tellurophene.

Among these, carboxyl group-substituted heterocyclic compounds, sulfonic acid group-substituted heterocyclic compounds, cyano group-substituted heterocyclic compounds, nitro group-substituted heterocyclic compounds, amido group-substituted heterocyclic compounds, halogen group-substituted heterocyclic compounds and so forth are used preferably in terms of practical use. In particular, carboxyl group-substituted heterocyclic compounds and sulfonic acid group-substituted heterocyclic compounds are used preferably.

Among these heterocyclic compounds, indole derivatives are used preferably.

There are no particular limitations on the oxidizing agent used in the aforementioned synthesis method of heterocyclic compound trimer (i), and examples include ferric chloride hexahydrate, anhydrous ferric chloride, ferric nitrate nonahydrate, ferric sulfate n-hydrate, ammonium ferric sulfate dodecahydrate, ferric perchlorate n-hydrate, ferric tetrafluoroborate, cupric chloride, cupric nitrate, cupric sulfate, cupric tetrafluoroborate, nitrosonium tetrafluoroborate, hydrogen peroxide, ammonium persulfate, sodium persulfate, potassium persulfate and potassium periodate. Among these, ferric chloride hexahydrate, anhydrous ferric chloride, cupric chloride, cupric tetrafluoroborate and ammonium persulfate are used preferably in terms of practical use, while ferric chloride hexahydrate and anhydrous ferric chloride are used most preferably in terms of practical use. Furthermore, these oxidizing agents may be used alone or two or more types may be combined at an arbitrary ratio.

The molar ratio of heterocyclic compound to oxidizing agent used in the aforementioned synthesis method of heterocyclic compound trimer (i) (heterocyclic compound: oxidizing agent) is 1:0.5 to 100, and preferably 1:1 to 50. Here, if the ratio of the oxidizing agent is low, reactivity decreases and raw materials remain. Conversely, if the ratio of the oxidizing agent is high, the trimer that is formed is oxidized excessively causing deterioration of the product.

Water or an inorganic solvent can be used for the solvent used in the aforementioned synthesis method of the heterocyclic compound trimer (i). There are no particular limitations on the organic solvent, and examples of organic solvents that are used include methanol, ethanol, isopropanol, acetone, acetonitrile, propionitrile, tetrahydrofuran, 1,4-dioxane, methyl isobutyl ketone, methyl ethyl ketone, γ-butyl lactone, propylene carbonate, sulfolane, nitromethane, N,N-dimethylformamide, N-methylacetoamide, dimethylsulfoxide, dimethylsulfone, N-methylpyrrolidone, benzene, toluene, xylene, methylene chloride, chloroform and dichloroethane. Furthermore, these solvents may be used alone or they may used as a mixture of two or more types at an arbitrary ratio. Among these solvents, acetone, acetonitrile, 1,4-dioxane, γ-butyl lactone and N,N-dimethylformamide are used preferably, while acetonitrile is used most preferably in terms of practical use.

In addition, in the aforementioned synthesis method of the heterocyclic compound trimer (i), the reaction is particularly preferably carried out in the presence of water and the organic solvent. The molar ratio of the heterocyclic compound to water (heterocyclic compound: water) is 1:1000 to 1000:1 and preferably 1:100 to 100:1. However, in the case the oxidizing agent contains crystalline water, that crystalline water is also calculated as water. Here, if the ratio of water is low, the reaction proceeds explosively, and simultaneous to excessive oxidation of the trimer and deterioration of its structure, $X^{a-}$ serving as dopant may be unable to efficiently dope the trimer, thereby resulting in decreased electrical conductivity. Conversely, if the ratio of water is excessively high, the progression of the oxidation reaction is obstructed which may cause a decrease in reaction yield.

In the aforementioned synthesis method of the heterocyclic compound trimer (i), the concentration of the heterocyclic compound during the reaction is 0.01% by mass or more, preferably 0.1 to 50% by mass, and more preferably within the range of 1 to 30% by mass relative to the solvent.

The $X^{a-}$ in the heterocyclic compound trimers used in the present invention represented by general formulas (16) to (19) represents a dopant, and is an anion of a protonic acid originating in the oxidizing agent and so forth during polymerization. More specifically, this anion is an anion having a valence of 1 to 3 such as chlorine ion, bromine ion, iodine ion, fluorine ion, nitrate ion, sulfate ion, hydrogen sulfate ion, phosphate ion, borofluoride ion, perchlorate ion, thiocyanate ion, acetate ion, propionate ion, p-toluene sulfonate ion, trifluoroacetate ion and trifluoromethane sulfonate ion, and is preferably an anion having a valence of 1 to 2 such as a chlorine ion, sulfate ion or borofluoride ion. This anion is most preferably a monovalent anion such as chlorine ion. In the case of carrying out polymerization by selecting anhydrous ferric chloride for the oxidizing agent, for example, dopant $X^{a-}$ in the indole derivative trimer is a chlorine ion, and in the case of carrying out polymerization using cupric trifluoroacetate, dopant $X^{a-}$ is a trifluoroacetate ion.

The heterocyclic compound trimer (i) obtained in the aforementioned synthesis method of the heterocyclic compound trimer (i) is a doped heterocyclic compound trimer (i) except for when hydrogen peroxide or ozone is used for the oxidizing agent, and the molar ratio (doping ratio) of the dopant $X^{a-}$ relative to its repeating unit is 0.001 to 0.5. The value of m becomes 0 when hydrogen peroxide or ozone is used for the oxidizing agent.

A heterocyclic compound trimer that is dedoped for the purpose of improving solubility in solvent (b) can be used for the heterocyclic compound trimer (i). Although there are no particular limitations on dedoping method, methods known as dedoping steps of various types of conducting polymers and charge transfer complexes in the prior art can be used. Namely, examples of these methods include a method in which indole derivative trimer (I) is suspended in an alkaline solution of aqueous ammonia, sodium hydroxide, potassium hydroxide or lithium hydroxide to remove dopant $X^{a-}$, or a method in which a dedoped indole derivative trimer (namely, doping ratio m=0) is obtained by reduction treatment.

The heterocyclic compound trimer (i) may have more superior electrical conductivity by having a layered structure. The heterocyclic compound trimer (i) preferably has a layered structure in which the interlayer interval is 0.1 to 5.0 nm, more preferably 0.1 to 2.0 nm and particularly preferably 0.1 to 1.0 nm. A compound having such a microlayered structure has satisfactory rigidity, strength, heat resistance and so forth. If the interlayer interval is 0.1 nm or more, the layered structure tends to become more stable, and if the interlayer interval is 2.0 nm or less, the hopping transfer of electrons between trimers becomes easier, thereby tending to improve electrical conductivity.

Furthermore, although the heterocyclic compound trimer (i) can be used as is, that imparted with an external dopant can be used by carrying out doping treatment by acid using a known method. For example, doping treatment can be carried out by immersing the heterocyclic compound trimer in an acidic solution. Specific examples of acidic solutions used for doping treatment include aqueous solutions containing inorganic acids such as hydrochloric acid, sulfuric acid and nitric acid, organic acids such as p-toluene sulfonic acid, camphasulfonic acid, benzoic acid and derivatives having these backbones, and high molecular weight acids such as polystyrene sulfonic acid, polyvinyl sulfonic acid, poly(2-acrylamide-2-methylpropane) sulfonic acid, polyvinyl sulfuric acid and derivatives having these backbones, or mixed solutions of water and organic solvent. Furthermore, these inorganic acids, organic acids and high molecular weight acids may each be used alone or they may be used as a mixture of two or more types at an arbitrary ratio.

In addition, although the indole derivative trimer oxidant represented by general formula (18), which is an asymmetrical heterocyclic compound trimer (i), can be obtained by a production method in which an asymmetrical indole derivative trimer is subjected to oxidation treatment with a known oxidizing agent in a solvent, there are cases in which the indole derivative trimer oxidant can be obtained as a result of the oxidation reaction proceeding more efficiently without using an oxidizing agent by simply dedoping an indole derivative trimer doped with an external dopant $X^{a-}$ from the doped form by deacidification treatment or reduction treatment, thereby making this production method extremely suitable industrially.

On the other hand, the heterocyclic compound oxidant represented by general formula (19), which is the symmetrical heterocyclic compound trimer (i), can be obtained by a known production method. For example, a symmetrical indole derivative trimer can be produced according to the method described in Japanese Unexamined Patent Application, First Publication No. 2001-261680.

The performance of these heterocyclic compound trimers (i) can be improved by using after increasing their purity by using a purification method such as recrystallization, reprecipitation purification or sublimation purification and so forth following their synthesis.

In the present invention, electrical conductivity, film formability and moldability are improved as a result of containing this heterocyclic compound trimer.

<Solvent (b)>

There are no particular limitations on solvent (b), which is an essential component of the present invention, provided it dissolves or disperses conducting polymer (a) or the heterocyclic compound trimer (i), carbon nanotubes (c), high molecular weight compound (d), basic compound (e), surfactant (f), silane coupling agent (g) and colloidal silica (h). Examples of the solvent (b) that are used preferably include water, alcohols such as methanol, ethanol, isopropyl alcohol, propyl alcohol and butanol; ketones such as acetone, methyl ethyl ketone, ethyl isobutyl ketone and methyl isobutyl ketone; ethylene glycols such as ethylene glycol, ethylene glycol methyl ether and ethylene glycol mono-n-propyl ether; propylene glycols such as propylene glycol, propylene glycol methyl ether, propylene glycol ethyl ether, propylene glycol butyl ether and propylene glycol propyl ether; amides such as dimethylformamide and dimethylacetoamide; pyrrolidones such as N-methylpyrrolidone and N-ethylpyrrolidone; hydroxyesters such as dimethylsulfoxide, γ-butyrolactone, methyl lactate, ethyl lactate, methyl β-methoxyisobutyrate and methyl α-hydroxyisobutyrate; and anilines such as aniline and N-methylaniline.

In the case of using a water soluble conducting polymer for the conducting polymer (a), water or a water-containing organic solvent is used preferably for the solvent (b) in consideration of the solubility of the water soluble conducting polymer and dispersivity of carbon nanotubes (c).

<Carbon Nanotubes (c)>

There are no particular limitations on carbon nanotubes (c), which are an essential component of the carbon nanotube composition of the present invention, and single-walled carbon nanotubes, multi-walled carbon nanotubes in which multiple walls are layered concentrically and their coiled forms can be used for the carbon nanotubes (c).

As a more detailed explanation of the carbon nanotubes (c), an example of such a carbon nanotube is a substance in which the outer diameter is extremely small on the order of nanometers and which comprises a plurality of cylinders, in which the surfaces of graphite-like carbon atoms in layers several atoms thick are rounded, that form a nested structure. In addition, carbon nanohoms, in which one side of a carbon nanotube is closed, or cup-shaped nanocarbon substances, in which a hole is formed in the top, can also be used.

There are no particular limitations on the production method of the carbon nanotubes (c) in the present invention. Specific examples of production methods include catalytic hydrogen reduction of carbon dioxide, arc discharge, laser vaporization, CVD, vapor phase growth and HiPco (high-pressure carbon monoxide process), in which carbon monoxide is reacted with an iron catalyst at high temperature and high pressure to grow carbon nanotubes in the vapor phase.

Preferable examples of carbon nanotubes (c) obtained by the aforementioned production methods are single-walled carbon nanotubes, and highly purified carbon nanotubes, which are obtained by various purification methods such as washing, centrifugal separation, filtration, oxidation and chromatography, are used preferably since they adequately demonstrate various functions.

In addition, crushed carbon nanotubes obtained by crushing using a ball mill, vibration mill, sand mill, roll mill or other ball-type kneading device, as well as shortly cut carbon nanotubes obtained by chemical or physical treatment, can also be used.

<High Molecular Weight Compound (d)>

The use of high molecular weight compound (d) in the carbon nanotube composition of the present invention further improves the base material adhesion and strength of the coated film.

There are no particular limitations on high molecular weight compound (d) in the present invention provided it can be dissolved or dispersed (emulsion formation) in the solvent (b) used in the present invention, specific examples of which include polyvinyl alcohols such as polyvinyl alcohol, polyvinyl formal and polyvinyl butyral; polyacrylamides such as polyacrylamide, poly(N-t-butylacrylamide and polyacrylamide methyl propane sulfonate; polyvinyl pyrrolidones; polystyrene sulfonates and their sodium salts; cellulose, alkyd resin, melamine resin, urea resin, phenol resin, epoxy resin, polybutadiene resin, acrylic resin, urethane resin, vinyl ester resin, urea resin, polyimide resin, maleic acid resin, polycarbonate resin, vinyl acetate resin, chlorinated polyethylene resin, chlorinated polypropylene resin, styrene resin, acrylic/styrene copolymer resin, vinyl acetate/acrylic copolymer resin, polyester resin, styrene/maleic acid copolymer resin, fluororesin and their copolymers. In addition, these high molecular weight compounds (d) may be used as a mixture of two or more types at an arbitrary ratio.

Among these high molecular weight compounds (d), water soluble high molecular weight compounds or high molecular weight compounds that form an emulsion in aqueous systems are used preferably in consideration of solubility in solvent, stability of the resulting composition and electrical conductivity, and high molecular weight compounds having an anion group are used particularly preferably. In addition, among these, those used by mixing one or two or more types of aqueous acrylic resin, aqueous polyester resin, aqueous urethane resin and aqueous chlorinated polyolefin resin are used preferably.

<Basic Compound (e)>

The basic compound (e) that composes a carbon nanotube composition of the present invention is effective for dedoping the water soluble conducting polymer or the heterocyclic compound trimer and improving solubility in solvent (b) as a result of being added to the carbon nanotube composition. In addition, together with considerably improving solubility in water by forming salts with sulfonic acid groups and carboxyl groups, basic compound (e) promotes solubilization or dispersion of the carbon nanotubes (c) in the solvent (b).

Although there are no particular limitations on the basic compound (e), examples of the basic compounds that are used preferably include ammonia, aliphatic amines, cyclic saturated amines, cyclic unsaturated amines and ammonium salts, and inorganic bases.

The structural formula of amines used for the basic compound (e) is shown in the following formula (14):

(14)

(in the formula (14), wherein $R^{45}$ to $R^{47}$ respectively and mutually independently represent hydrogen, alkyl group having 1 to 4 carbon atoms ($C_1$ to $C_4$), $CH_2OH$, $CH_2CH_2OH$, $CONH_2$ or $NH_2$).

The structural formula of ammonium salts used for basic compound (e) is shown in the following formula (15):

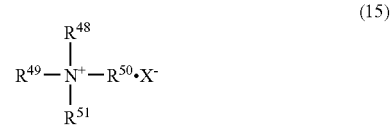

(15)

(in the formula (15), wherein $R^{48}$ to $R^{51}$ respectively and mutually independently represent hydrogen, alkyl group having 1 to 4 carbon atoms ($C_1$ to $C_4$), $CH_2OH$, $CH_2CH_2OH$, $CONH_2$ or $NH_2$, $X^-$ represents $OH^-$, $½.SO_4^{2-}$, $NO_3^-$, $½.CO_3^{2-}$, $HCO_3^-$, $½.(COO)_2^{2-}$ or $R'COO^-$, and $R'$ represents an alkyl group having 1 to 3 carbon atoms ($C_1$ to $C_3$)).

Examples of cyclic saturated amines that are used preferably include piperidine, pyrrolidine, morpholine, piperazine, derivatives having these backbones and their ammonium hydroxide compounds.

Examples of cyclic unsaturated amines that are used preferably include pyridine, α-picoline, β-picoline, γ-picoline, quinoline, isoquinoline, pyrroline, derivatives having their backbones and their ammonium hydroxide compounds.

Examples of inorganic bases that are used preferably include sodium hydroxide, potassium hydroxide, lithium hydroxide and other hydroxides.

Two or more types of the basic compound (e) may be used by mixing. For example, electrical conductivity can be further improved by using a mixture of an amine and an ammonium salt. Specific examples of such mixtures include $NH_3/(NH_4)_2CO_3$, $NH_3/(NH_4)HCO_3$, $NH_3/CH_3COONH_4$, $NH_3/(NH_4)_2SO_4$, $N(CH_3)_3/CH_3COONH_4$ and $N(CH_3)_3/(NH_4)_2SO_4$. In addition, although these mixtures can be used in arbitrary mixing ratios, the ratio of amine to ammonium salt (amine/ammonium salt) is preferably 1/10 to 10/0.

<Surfactant (f)>

Although a carbon nanotube composition of the present invention is able to form a high-performance film without undergoing separation of aggregation even when stored for a long period of time by solubilizing or dispersing carbon nanotubes (c) with the aforementioned conducting polymer (a) or heterocyclic compound trimer (i), solvent (b), carbon nanotubes (c), high molecular weight compound (d) and basic compound (e) alone, addition of surfactant (f) not only makes it possible to further promote solubilization or dispersion, but also improves flatness, coatability and electrical conductivity.

Specific examples of the surfactant (f) that are used include anionic surfactants such as alkyl sulfonic acid, alkyl benzene sulfonic acid, alkyl carboxylic acid, alkyl naphthalene sulfonic acid, α-olefin sulfonic acid, dialkyl sulfosuccinic acid, α-sulfonated fatty acids, N-methyl-N-oleyltaurine, petroleum sulfonic acid, alkyl sulfuric acids, sulfated oils, polyoxyethylene alkyl ether sulfuric acid, polyoxyethylene styrenated phenyl ether sulfuric acid, alkyl phosphoric acids, polyoxyethylene alkyl ether phosphoric acid, polyoxyethylene alkyl phenyl ether phosphoric acid, naphthalene sulfonic acid formaldehyde condensates and their salts; cationic surfactants such as primary to tertiary fatty amines, quaternary ammonium, tetraalkyl ammonium, trialkyl benzyl ammonium alkyl pyridinium, 2-alkyl-1-alkyl-1-hydroxyethyl imidazolinium, N,N-dialkylmorpholinium, polyethylene polyamine fatty acid amides, urea condensates of polyethylene polyamine fatty acid amides, quaternary ammonium of urea condensates of polyethylene polyamine fatty acid amides and their salts; betaines such as N,N-dimethyl-N-alkyl-N-carboxymethyl ammonium betaines, N,N,N-trialkyl-N-sulfoalkylene ammonium betaines, N,N-dialkyl-N,N-bispolyoxyethylene ammonium sulfuric acid ester betaines and 2-alkyl-1-carboxymethyl-1-hydroxyethylimidazolinium betaines; amphoteric surfactants such as N,N-dialkylaminoalkylene carbonates; nonionic surfactants such as polyoxyethylene alkyl ethers, polyoxyethylene alkyl phenyl ethers, polyoxyethylene polystyryl phenyl ethers, polyoxyethylene-polyoxypropylene glycols, polyoxyethylene-polyoxypropylene alkyl ethers, polyvalent alcohol fatty acid partial esters, polyoxyethylene polyvalent alcohol fatty acid partial esters, polyoxyethylene fatty acid esters, polyglycerin fatty acid esters, polyoxyethylenated castor oil, fatty acid diethanol amides, polyoxyethylene alkyl amines, triethanol amine fatty acid partial esters and trialkylamine oxides; and fluorine-based surfactants such as fluoroalkyl carboxylic acid, perfluoroalkyl carboxylic acid, perfluoroalkyl benzene sulfonic acid and perfluoroalkyl polyoxyethylene ethanol. Here, alkyl groups preferably have 1 to 24 carbon atoms and more preferably 3 to 18 carbon atoms. Furthermore, two or more types of surfactants may be used.

<Silane Coupling Agent (g)>

A silane coupling agent (g) can be used in the present invention in combination with the carbon nanotube composition of the present invention containing the conducting polymer (a) or the heterocyclic compound trimer (i), the solvent (b), the carbon nanotubes (c), the high molecular weight compound (d), the basic compound (e) and the surfactant (f). The moisture resistance of a coated film obtained from a carbon nanotube composition that uses a silane coupling agent (g) is remarkably improved. A silane coupling agent (g) represented by the following formula (1) is used for silane coupling agent (g):

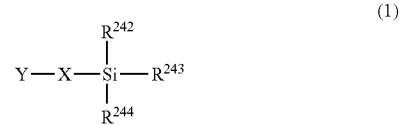

(in the formula (1) wherein, $R^{242}$, $R^{243}$ and $R^{244}$ respectively and independently represent a group selected from the group consisting of hydrogen, a linear or branched alkyl group having 1 to 6 carbon atoms, linear or branched alkoxy group having 1 to 6 carbon atoms, amino group, acetyl group, phenyl group and halogen group, X represents the following:

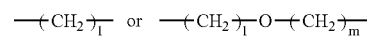

l and m represent values from 0 to 6, and Y represents a group selected from the group consisting of a hydroxyl group, thiol group, amino group, epoxy group and epoxycyclohexyl group).

More specifically, examples of silane coupling agents having an epoxy group include γ-glycidyloxypropyl trimethoxysilane, γ-glycidyloxypropyl methyl dimethoxysilane and γ-glycidyloxypropyl triethoxysilane.

Examples of silane coupling agents having an amino group include γ-aminopropyl triethoxysilane, β-aminoethyl trimethoxysilane and γ-aminopropoxypropyl trimethoxysilane.

Examples of silane coupling agents having a thiol group include γ-mercaptopropyl trimethoxysilane and β-mercaptoethyl methyl dimethoxysilane.

Examples of silane coupling agents having a hydroxyl group include β-hydroxyethoxyethyl triethoxysilane and γ-hydroxypropyl trimethoxysilane.

Examples of silane coupling agents having an epoxycyclohexyl group include β-(3,4-epoxycyclohexyl)ethyl trimethoxysilane.

<Colloidal Silica (h)>

In the present invention, colloidal silica (h) can also be used in a crosslinked carbon nanotube composition containing the conducting polymer (a) or the heterocyclic compound trimer (i), the solvent (b), the carbon nanotubes (c), the high molecular weight compound (d), the basic compound (e), the surfactant (f) and the silane coupling agent (g). A coated film obtained from a carbon nanotube composition that combines the use of colloidal silica (h) has remarkably improved surface hardness and weather resistance.

Although there are no particular limitations on the colloidal silica (h) in the present invention, that which is dispersed in water, organic solvent, or a mixed solvent of water and organic solvent is used preferably. Although there are no particular limitations on the organic solvent, examples of organic solvents that are used preferably include alcohols such as methanol, ethanol, isopropyl alcohol, propyl alcohol, butanol and pentanol; ketones such as acetone, methyl ethyl ketone, ethyl isobutyl ketone and methyl isobutyl ketone; ethylene glycols such as ethylene glycol, ethylene glycol methyl ether and ethylene glycol mono-n-propyl ether, and propylene glycols such as propylene glycol, propylene glycol methyl ether, propylene glycol ethyl ether, propylene glycol butyl ether and propylene glycol propyl ether.

In addition, colloidal silica having a particle diameter within the range of 1 nm to 300 nm, preferably 1 nm to 150 nm and more preferably 1 nm to 50 nm is used for the colloidal silica (h). Here, if the particle diameter is too large, hardness becomes inadequate or the solution stability of the colloidal silica itself ends up decreasing.

<Carbon Nanotube Composition>

The usage ratio between the aforementioned conducting polymer (a) or heterocyclic compound trimer (i) and the solvent (b) is preferably 0.001 to 50 parts by mass, and more preferably 0.01 to 30 parts by mass of the conducting polymer (a) or the heterocyclic compound trimer (i) relative to 100 parts by mass of the solvent (b). If the ratio of the conducting polymer (a) or the heterocyclic compound trimer (i) is less than 0.001 parts by mass, electrical conductivity deteriorates or the solubilization or dispersion efficiency of carbon nanotubes (c) decreases. On the other hand, if the ratio exceeds 50 parts by mass, electrical conductivity reaches a peak and does not increase further and viscosity becomes excessively high thereby causing a decrease in the solubilization or dispersion efficiency of the carbon nanotubes (c).

The usage ratio between the aforementioned carbon nanotubes (c) and solvent (b) is preferably 0.0001 to 20 parts by mass, and more preferably 0.001 to 10 parts by mass of the carbon nanotubes (c) relative to 100 parts by mass of the solvent (b). If the ratio of the carbon nanotubes (c) used is less than 0.0001 parts by mass, performance such as electrical conductivity resulting from the use of carbon nanotubes (c) decreases. On the other hand, if the amount used exceeds 20 parts by mass, the solubilization or dispersion efficiency of the carbon nanotubes (c) decreases.

The usage ratio between the aforementioned high molecular weight compound (d) and solvent (b) is preferably 0.1 to 400 parts by mass, and more preferably 0.5 to 300 parts by mass of the high molecular weight compound (d) relative to 100 parts by mass of the solvent (b). If the ratio of high molecular weight compound (d) is greater than or equal to 0.1 parts by mass, film formablity, moldability and strength are further improved, while on the other hand, when the ratio of the high molecular weight compound (d) is less than or equal to 400 parts by mass, there is little decrease in the solubility of the water soluble conducting polymer (a) or the heterocyclic compound trimer (i) or the carbon nanotubes (c), and a high degree of electrical conductivity is maintained.

The usage ratio between the aforementioned basic compound (e) and solvent (b) is preferably 0.1 to 10 parts by mass, and more preferably 0.1 to 5 parts by mass of the basic compound (e) relative to 100 parts by mass of the solvent (b). When the usage ratio of the basic compound (e) is within this range, the solubility of the water soluble conducting polymer improves, the solubilization or dispersion of the carbon nanotubes (c) in the solvent (b) is promoted, and electrical conductivity improves.

The usage ratio between the aforementioned surfactant (f) and solvent (b) is preferably 0.0001 to 10 parts by mass, and more preferably 0.01 to 5 parts by mass of the surfactant (f) relative to 100 parts by mass of the solvent (b). Although coatability improves if the usage ratio of the surfactant (f) exceeds 10 parts by mass, in addition to the occurrence of phenomena such as deterioration of electrical conductivity, the solubilization or dispersion of the carbon nanotubes (c) decreases.

The usage ratio between the aforementioned silane coupling agent (g) and solvent (b) is preferably 0.001 to 20 parts by mass, and more preferably 0.01 to 15 parts by mass of the silane coupling agent (g) to 100 parts by mass of the solvent (b). If the usage ratio of the silane coupling agent (g) is less than 0.001 parts by mass, the amount of improvement in at least one of moisture resistance and solvent resistance becomes comparatively smaller, while on the other hand, if the usage ratio exceeds 20 parts by mass, solubility, flatness, transparency and electrical conductivity may worsen.

The usage ratio between the aforementioned colloidal silica (h) and solvent (b) is preferably 0.001 to 100 parts by mass, and more preferably 0.01 to 50 parts by mass of the colloidal silica (h) relative to 100 parts by mass of the solvent (b). If the ratio of the colloidal silica (h) is 0.001 parts by mass or more, the amount of improvement in moisture resistance, weather resistance and hardness increases. On the other hand, if the ratio exceeds 100 parts by mass, solubility, flatness, transparency and electrical ductivity worsen.

Moreover, various types of known substances can be added to the carbon nanotube composition of the present invention as necessary, examples of which include plasticizers, dispersants, coated surface adjusters, fluidity adjusters, ultraviolet absorbers, antioxidants, preservatives, adhesion assistants and thickeners.

In addition, an conducting substance can be incorporated in the carbon nanotube composition of the present invention in order to further improve electrical conductivity. Examples of the conducting substances include carbon fibers, conducting carbon black, graphite and other carbon-based substances, tin oxide, zinc oxide and other metal oxides, and metals such as silver, nickel and copper.

<Production Method of Carbon Nanotube Composition>

A stirring or kneading device such as an ultrasonic wave device, homogenizer, spiral mixer, planetary mixer, dispenser or hybrid mixer is used when mixing these components. In particular, it is preferable to mix the conducting polymer (a) or the heterocyclic compound trimer (i), the solvent (b), the carbon nanotubes (c) and other components and irradiate them with ultrasonic waves,. At that time, it is preferable to use irradiation of ultrasonic waves in combination with a homogenizer (ultrasonic homogenizer).

Although there are no particular limitations on the conditions of irradiation with ultrasonic waves, the intensity and treatment time of the ultrasonic waves should be adequate for uniformly dispersing or dissolving the carbon nanotubes (c) in the solvent (b). For example, the rated output of an ultrasonic oscillator is preferably within the range of 0.1 to 2.0 watts/cm$^2$, and more preferably 0.3 to 1.5 watts/cm$^2$, per unit bottom surface area of the ultrasonic oscillator, and the oscillation frequency is preferably within the range of 10 to 200 KHz and more preferably 20 to 100 KHz. In addition, the duration of ultrasonic irradiation treatment is preferably 1 minute to 48 hours and more preferably 5 minutes to 48 hours. Dispersion or dissolution is preferably subsequently improved by using a ball-type kneading device such as a ball mill, vibration mill, sand mill or roll mill.

<Composite>

Examples of base materials that form a coated film by coating with the carbon nanotube composition in the present invention include high molecular weight compounds, plastics, wood, paper, ceramics, fibers, non-woven fabrics, carbon fibers, carbon fiber paper and their films, foams, porous films, elastomers and glass plates.

Examples of high molecular weight compounds, plastics and films include polyethylene, polyvinyl chloride, polypropylene, polystyrene, ABS resin, AS resin, methacrylic resin, polybutadiene, polycarbonate, polyarylate, polyvinylidene fluoride, polyester, polyamide, polyimide, polyaramid, polyphenylene sulfide, polyether ethyl ketone, polyphenylene ether, polyether nitrile, polyamide imide, polyether sulfone, polysalfone, polyether imide, polybutylene terephthalate, polyurethane and their films, foams and elastomers. In order to form a coated film on at least one of their surfaces, the surfaces of these films are preferably subjected to corona discharge treatment or plasma treatment for the purpose of improving adhesion of the coated film.

A coated film in the present invention is formed on the surface of a base material by a method used for ordinary coating. Examples of methods used include coating methods using a gravure coater, roll coater, curtain flow coater, spin coater, bar coater, reverse coater, kiss coater, fountain coater, rod coater, air doctor coater, knife coater, blade coater, cast coater or screen coater, spraying methods such as air spraying or airless spraying, and immersion methods such as dipping.

Although the carbon nanotube composition can be allowed to stand at normal temperatures after coating onto the surface of a base material, the coated film can also be heat-treated. The performing of heat treatment is preferable since the crosslinking reaction between the carbon nanotubes (c), the high molecular weight compound (d) and the basic compound (e) and the conducting polymer (a) or the heterocyclic compound trimer (i) can be further promoted, moisture resistance can be imparted in a shorter period of time, the residual amount of the solvent (b) can be further reduced and electrical conductivity can be further improved. The temperature of heat treatment is preferably 20 to 250° C. and particularly preferably 40 to 200° C. If the temperature of heat treatment is higher than 250° C., the conducting polymer (a) itself or the heterocyclic compound trimer (i) itself is decomposed, and electrical conductivity may be degraded.

The film thickness of the coated film is preferably within the range of 0.01 to 100 μm, and more preferably within the range of 0.1 to 50 μm.

Although the composite of the present invention has superior electrical conductivity even if used as is, electrical conductivity can be further improved by doping with acid after having formed a coated film of the carbon nanotube composition on at least one surface of the base material, and then allowing to stand at ordinary temperatures or heat treating.

There are no particular limitations on the method used for acid doping and known methods can be used. For example, doping can be carried out by immersing a conductor in an acidic solution. Specific examples of acidic solutions include aqueous solutions containing inorganic acids such as hydrochloric acid, sulfuric acid and nitric acid, organic acids such as p-toluene sulfonic acid, camphasulfonic acid, benzoic acid, and derivatives having their backbones, and high molecular weight acids such as polystyrene sulfonic acid, polyvinyl sulfonic acid, poly(2-acrylamide-2-methylpropane) sulfonic acid, polyvinyl sulfuric acid and derivatives having their backbones, as well as mixed solvents of water and organic solvent. Furthermore, these inorganic acids, organic acids and high molecular weight acids may each be used alone or two or more types may be used as a mixture at an arbitrary ratio.

Although the following provides a more detailed explanation of the present invention through its examples, the following examples are not intended to limit the scope of the present invention in any way.

<Production of Conducting Polymer>

PRODUCTION EXAMPLE 1

Conducting Polymer (A-1)

Synthesis of Poly(2-sulfo-5-methoxy-1,4-iminophenylene)

100 mmol of 2-aminoanisol-4-benzene sulfonic acid were stirred and dissolved in a 4 mol/liter aqueous solution of triethylamine at 25° C., then a 100 mmol aqueous solution of ammonium peroxodisulfate was dropped in the mixture. Following completion of dropping and stirring for an additional 12 hours at 25° C., the reaction product was filtered, washed and then dried to obtain 15 g of a polymer powder. The volumetric resistance of this conducting polymer (A-1) was 9.0 Ω·cm.

PRODUCTION EXAMPLE 2

Conducting Polymer (A-2)

Synthesis of Poly(2-sulfo-1,4-iminophenylene)

100 mmol of m-aminobenzene sulfonic acid were stirred and dissolved in a 4 mol/liter aqueous solution of trimethylamine at 25° C., then a 100 mmol aqueous solution of ammonium peroxodisulfate was dropped in the mixture. Following completion of dropping and stirring for an additional 12 hours at 25° C., the reaction product was filtered, washed and then dried to obtain 10 g of a polymer powder. The volumetric resistance of this conducting polymer (A-2) was 12.0 Ω·cm.

PRODUCTION EXAMPLE 3

Conducting Polymer (A-3)

Synthesis of Sulfonated Polyaniline

Poly(2-sulfo-1,4-iminophenylene) was synthesized according to a known method (J. Am. Chem. Soc., (1991), 113, 2665-2666). The sulfonic acid content of the resulting polymer was 52% relative to the aromatic ring. In addition, the volumetric resistance of this conducting polymer (A-3) was 50 Ω·cm.

PRODUCTION EXAMPLE 4

Conducting Polymer (A-4)

Synthesis of Dedoped Polyaniline 100 mmol of aniline were stirred and dissolved in a 1 mol/liter aqueous solution of sulfuric acid at 25° C., followed by dropping in a 100 mmol aqueous solution of ammonium peroxodisulfate. Following completion of dropping and stirring for an additional 12 hours at 25° C., the reaction product was filtered, washed and then dried to obtain 8 g of a polymer powder. The resulting doped polymer was press molded with a tablet molding machine and cut to a diameter of 10 mm and thickness of 1 mm. When the conductivity was measured with the four probe method, it was found to be 1.0 S/cm or less. After dispersing and stirring this polymer in 1 mol/liter aqueous ammonia for 1 hour at 25° C., it was filtered, washed and then dried to obtain 5 g of dedoped polymer powder.

<Preparation of Carbon Nanotube Composition>

EXAMPLE 1

5 parts by mass of the aforementioned conducting polymer (A-1) of Production Example 1 and 0.4 parts by mass of carbon nanotubes (Iljin, multi-walled carbon nanotubes produced by CVD) were mixed in 100 parts by mass of water at room temperature to prepare a carbon nanotube composition 1.

EXAMPLE 2

5 parts by mass of the aforementioned conducting polymer (A-1) of Production Example 1, 0.1 parts by mass of carbon nanotubes and 20 parts by mass of acrylic resin in an aqueous emulsion form (Dianal MX-1845, Mitsubishi Rayon Co., Ltd., resin content: 40% by mass) were mixed in 100 parts of water at room temperature to prepare a carbon nanotube composition 2.

EXAMPLE 3

3 parts by mass of the aforementioned conducting polymer (A-2) of Production Example 2, 0.1 parts by mass of carbon nanotubes and 1 part by mass of ammonia were mixed in 100 parts by mass of water at room temperature to prepare a carbon nanotube composition 3.

EXAMPLE 4

1 part by mass of the aforementioned conducting polymer (A-1) of Production Example 1, 0.2 parts by mass of carbon nanotubes, 1 part by mass of triethylamine and 20 parts by mass of acrylic resin in an aqueous emulsion form (Dianal MX-1845, Mitsubishi Rayon Co., Ltd.) were mixed in 100 parts by mass of water at room temperature to a prepare carbon nanotube composition 4.

EXAMPLE 5

1 part by mass of the aforementioned conducting polymer (A-3) of Production Example 3, 0.4 parts by mass of carbon nanotubes and 0.5 parts by mass of dodecylbenzene sulfonate were mixed in 100 parts by mass of a water/methanol mixed solvent (weight ratio: 9/1) at room temperature to prepare a carbon nanotube composition 5.

EXAMPLE 6

1 part by mass of the aforementioned conducting polymer (A-1) of Production Example 1, 0.4 parts by mass of carbon nanotubes and 0.5 parts by mass of γ-glycidoxypropyl trimethoxysilane were mixed in 100 parts by mass of water at room temperature to prepare a carbon nanotube composition 6.

EXAMPLE 7

1 part by mass of the aforementioned conducting polymer (A-1) of Production Example 1, 0.4 parts by mass of carbon nanotubes, 0.5 parts by mass of γ-glycidoxypropyl trimethoxysilane, 5 parts by mass of colloidal silica (particle diameter: 10 nm) and 10 parts by mass of acrylic resin in an aqueous emulsion form (Dianal MX-1845, Mitsubishi Rayon Co., Ltd.) were mixed in 100 parts by mass of water at room temperature to prepare a carbon nanotube composition 7.

EXAMPLE 8

0.5 parts by mass of the aforementioned conducting polymer (A-4) of Production Example 4 and 0.1 parts by mass of carbon nanotubes were mixed in 100 parts by mass of N-methylpyrrolidone at room temperature to prepare a carbon nanotube composition 8.

COMPARATIVE EXAMPLE 1

0.1 part by mass of carbon nanotubes were mixed in 100 parts by mass of water at room temperature to prepare a carbon nanotube composition 8.

COMPARATIVE EXAMPLE 2

0.1 part by mass of carbon nanotubes and 1 part by mass of ammonia were mixed in 100 parts by mass of water at room temperature to prepare a carbon nanotube composition 9.

COMPARATIVE EXAMPLE 3

0.1 part by mass of carbon nanotubes and 20 parts by mass of acrylic resin in an aqueous emulsion form (Dianal Mx-1845, Mitsubishi Rayon Co., Ltd.) were mixed in 100 parts by mass of water at room temperature to prepare a carbon nanotube composition 10.

COMPARATIVE EXAMPLE 4

5 parts by mass of the aforementioned conducting polymer (A-1) of Production Example 1 were mixed in 100 parts by mass of water at room temperature to prepare a conducting composition 1.

In the following production examples of indole derivative trimers, elementary analysis and measurements were carried out using the Thermoquest EA1110. Electrical conductivity was measured with the MCP-T350 conductivity gauge (Mitsubishi Chemical) (four probe method, electrode interval: 1 mm). Moreover, X-ray diffraction (XRD) was measured with the RINT-1100 (Rigaku Corporation) (tube: CuK, X-rays).

PRODUCTION EXAMPLE 5

Synthesis of Indole-5-Carboxylic Acid Trimer 10 ml of acetonitrile were placed in a 200 ml three-mouth flask followed by dissolving 1.42 g of indole-5-carboxylic acid. On the other hand, preparation of the oxidizing agent solution was carried out by dissolving 16.2 g of anhydrous ferric chloride and 5.4 g of water in 40 ml of acetonitrile and stirring for 10 minutes. Next, after dropping in the prepared oxidizing agent solution into the aqueous indole-5-carboxylic acid solution over the course of 30 minutes, the solution was stirred for 10 hours at 60° C. The reaction solution changed from a pale yellow color to a light green color while generating a small amount of heat, and its pH was 1 or less. Following completion of the reaction, the reaction solution was aspiration filtered with a Kiriyama funnel, washed with acetonitrile and then methanol and dried to obtain 1.12 g of light green 6,11-dihydro-5H-diindolo[2,3-a:2',3'-c]carbazole-2,9,14-tricarboxylic acid (indole-5-carboxylic acid trimer) (yield: 79%).

When the resulting trimer was press molded with a tablet molding machine and cut to a diameter of 10 mm and thickness of 1 mm followed by measurement of electrical conductivity using the four probe method, it was 0.41 S/cm. The result of elementary analysis was $(C_{9.00}H_{4.90}N_{1.09}O_{1.98}Cl_{0.11})_3$. In addition, the result of X-ray diffraction crystal analysis was an interlayer interval of 0.48 nm.

PRODUCTION EXAMPLE 6

Synthesis of Indole-5-Sulfonic Acid Trimer

With the exception of using indole-5-sulfonic acid instead of indole-5-carboxylic acid in Production Example 5, polymerization was carried out in the same manner as Production Example 5 to obtain 1.01 g of green 6,11-dihydro-5H-diindolo[2,3-a:2',3'-c]carbazole-2,9,14-trisulfonic acid (indole-5-sulfonic acid trimer) (yield: 71%).

When the resulting trimer was press molded with a tablet molding machine and cut to a diameter of 10 mm and thickness of 1 mm followed by measurement of electrical conductivity using the four probe method, it was 0.56 S/cm. The result of elementary analysis was $(C_{8.00}H_{4.85}N_{1.06}O_{3.01}S_{1.06}Cl_{0.11})_3$.

PRODUCTION EXAMPLE 7

Synthesis of Indole-5-Carbonitrile Trimer

With the exception of using indole-5-carbonitrile instead of indole-5-carboxylic acid in Production Example 5, polymerization was carried out in the same manner as Production Example 5 to obtain 1.22 g of green 6,11-dihydro-5H-diindolo[2,3-a:2',3'-c]carbazole-2,9,14-tricarbonitrile (indole-5-carbonitrile trimer) (yield: 86%).

When the resulting trimer was press molded with a tablet molding machine and cut to a diameter of 10 mm and thickness of 1 mm followed by measurement of electrical conductivity using the four probe method, it was 0.50 S/cm. The result of elementary analysis was $(C_{9.00}H_{4.03}N_{1.97}Cl_{0.10})_3$. In addition, the result of X-ray diffraction cry analysis was an interlayer interval of 0.44 nm.

PRODUCTION EXAMPLE 8

Synthesis of Indole-5-Carboxylic Acid Trimer Oxidant 1.00 g of the indole-5-carboxylic acid trimer synthesized in Production Example 5 was dissolved in 50 ml of 1 M aqueous ammonia and stirred for 1 hour. After stirring, it was re-precipitated in 50 ml of acetonitrile and the resulting precipitate was suction filtered with a Kiriyama funnel, washed with water and then acetonitrile and dried to obtain 0.92 g of the black oxidant of indole-5-carboxylic acid trimer. The result of elementary analysis was $(C_{9.00}H_{4.34}N_{1.07}O_{1.99})_3$.

PRODUCTION EXAMPLE 9

Synthesis of Symmetrical Indole Trimer 50.0 g of oxyindole were stirred for 10 hours at 100° C. in air using 100 ml of phosphorous oxychloride as solvent in a 300 ml three-mouth flask. After slowly pouring the reaction liquid into ice water and crushing the excess phosphorous oxychloride, the liquid was neutralized with aqueous sodium hydroxide. The target compound was then extracted from this solution with chloroform and dried with magnesium sulfate. The solvent was distilled off from the filtrate and purified by column chromatography to obtain 32.5 g of indole trimer (symmetrical form).

EXAMPLE 9

5 parts by mass of the aforementioned indole-5-carboxylic acid trimer of Production Example 5 and 0.4 parts by mass of carbon nanotubes (Iljin, multi-walled carbon nanotubes produced by CVD) were mixed in 100 parts by mass of water at room temperature to prepare a carbon nanotube composition.

EXAMPLE 10

3 parts by mass of the aforementioned indole-5-carboxylic acid trimer of Production Example 5, 0.1 parts by mass of carbon nanotubes and 20 parts by mass of acrylic resin in an aqueous emulsion form (Dianal MX-1845, Mitsubishi Rayon Co., Ltd.) were mixed in 100 parts by mass of water at room temperature to prepare a carbon nanotube composition.

EXAMPLE 11

3 parts by mass of the aforementioned indole-5-sulfonic acid trimer of Production Example 6, 0.1 parts by mass of carbon nanotubes and 1 part by mass of ammonia were mixed in 100 parts by mass of water at room temperature to prepare a carbon nanotube composition.

EXAMPLE 12

3 parts by mass of the aforementioned indole-5-sulfonic acid trimer of Production Example 6, 0.2 parts by mass of carbon nanotubes, 1 part by mass of triethylamine and 20 parts by mass of acrylic resin in an aqueous emulsion form (Dianal MX-1845, Mitsubishi Rayon Co., Ltd.) were mixed in 100 parts by mass of water at room temperature to prepare a carbon nanotube composition.

EXAMPLE 13

1 part by mass of the aforementioned indole-5-carbonitrile trimer of Production Example 7, 0.4 parts by mass of carbon nanotubes and 0.5 parts by mass of dodecylbenzene sulfonate were mixed in 100 parts by mass of dimethylsulfoxide at room temperature to prepare a carbon nanotube composition.

EXAMPLE 14

3 parts by mass of the aforementioned indole-5-carboxylic acid trimer oxidant of Production Example 8, 0.4 parts by mass of carbon nanotubes and 0.5 parts by mass of γ-glycidoxypropyl trimethoxysilane were mixed in 100 parts by mass of water at room temperature to prepare a carbon nanotube composition.

EXAMPLE 15

3 parts by mass of the aforementioned symmetrical indole trimer of Production Example 9, 0.4 parts by mass of carbon nanotubes and 10 parts by mass of acrylic resin in an aqueous emulsion form (Dianal MX-1845, Mitsubishi Rayon Co., Ltd.) were mixed in 100 parts by mass of water at room temperature to prepare a carbon nanotube composition.

COMPARATIVE EXAMPLE 5

1 part by mass of the aforementioned indole-5-carbonitrile trimer of Production Example 7 and 0.5 parts by mass of dodecylbenzene sulfonate were mixed in 100 parts by mass of dimethylsulfoxide at room temperature to prepare a conducting composition.

<Evaluation Method>

Absence of Ultrasonic Treatment

After visually observing the states of the compositions obtained in the aforementioned examples and comparative examples, the compositions were coated onto a glass plate according to the bar coater method (using a No. 5 bar coater). After drying for 5 minutes at 80° C. to form a coated film and then observing its appearance, the surface resistance was measured. Those results are shown in Table 1.

However, in the case of carbon nanotube composition 8 obtained in Example 8, the composition was coated onto a glass plate according to the bar coater method (using a No. 5 bar coater) and dried for 5 minutes at 150° C. to form a coated film followed by immersing for 5 minutes in a 1 mol/liter aqueous solution of sulfuric acid. After then drying for 5 minutes at 80° C. and observing the appearance, the surface resistance was measured.

Presence of Ultrasonic Treatment

The compositions obtained in the aforementioned examples and comparative examples were subjected to ultrasonic treatment for 1 hour (UA100, Shinmei Daiko, 36 KHz), and after visually observing the states of the compositions, the compositions were coated onto a glass plate according to the bar coater method (using a No. 5 bar coater). After drying for 5 minutes at 80° C. to form a coated film and then observing its appearance, the surface resistance was measured. Those results are shown in Table 1.

However, in the case of carbon nanotube composition 8 obtained in Example 8, the composition was coated onto a glass plate according to the bar coater method (using a No. 5 bar coater) and dried for 5 minutes at 150° C. to form a coated film followed by immersing for 5 minutes in a 1 mol/liter aqueous solution of sulfuric acid. After then drying for 5 minutes at 80° C. and observing the appearance, the surface resistance was measured.

Solution State

The solution state was observed visually 24 hours after having prepared the carbon nanotube compositions. Those results are shown in Table 1.
- ○: Uniformly dispersed or dissolved
- X: Non-uniformly dispersed Surface Resistance The two probe method (electrode interval: 20 mm) was used to measure surface resistance under conditions of 25° C. and 15% RH for surface resistance values of $10^8$ Ω or more, while the four probe method (electrode interval: 5 mm) was used for surface resistance values of $10^7$ Ω or less. Those results are shown in Table 1.

Coated Film Appearance

The state of the coated film was observed visually. Those results are shown in Table 1.
- ○: Uniform coated film formed
- X: Coated film observed in which carbon nanotubes are not present uniformly

TABLE 1

| | Ultrasonic Treatment | Solution State | Surface Resistance | Coated Film Appearance |
|---|---|---|---|---|
| Example 1 | No | ○ | $6.6 \times 10^3$ | ○ |
| | Yes | ○ | $1.9 \times 10^2$ | ○ |
| Example 2 | No | ○ | $8.3 \times 10^4$ | ○ |
| | Yes | ○ | $6.2 \times 10^3$ | ○ |
| Example 3 | No | ○ | $3.5 \times 10^4$ | ○ |
| | Yes | ○ | $1.5 \times 10^3$ | ○ |
| Example 4 | No | ○ | $1.1 \times 10^6$ | ○ |
| | Yes | ○ | $8.6 \times 10^4$ | ○ |
| Example 5 | No | ○ | $2.9 \times 10^3$ | ○ |
| | Yes | ○ | $5.3 \times 10^2$ | ○ |
| Example 6 | No | ○ | $9.2 \times 10^3$ | ○ |
| | Yes | ○ | $7.9 \times 10^2$ | ○ |
| Example 7 | No | ○ | $5.7 \times 10^5$ | ○ |
| | Yes | ○ | $2.5 \times 10^4$ | ○ |
| Example 8 | No | ○ | $6.4 \times 10^4$ | ○ |
| | Yes | ○ | $3.9 \times 10^3$ | ○ |
| Example 9 | No | ○ | $1.8 \times 10^4$ | ○ |
| | Yes | ○ | $1.3 \times 10^3$ | ○ |
| Example 10 | No | ○ | $4.2 \times 10^6$ | ○ |
| | Yes | ○ | $3.9 \times 10^5$ | ○ |
| Example 11 | No | ○ | $1.1 \times 10^6$ | ○ |
| | Yes | ○ | $2.1 \times 10^5$ | ○ |
| Example 12 | No | ○ | $3.2 \times 10^6$ | ○ |
| | Yes | ○ | $1.3 \times 10^5$ | ○ |
| Example 13 | No | ○ | $6.4 \times 10^6$ | ○ |
| | Yes | ○ | $6.9 \times 10^5$ | ○ |
| Example 14 | No | ○ | $9.1 \times 10^5$ | ○ |
| | Yes | ○ | $1.5 \times 10^5$ | ○ |
| Example 15 | No | ○ | $5.2 \times 10^5$ | ○ |
| | Yes | ○ | $8.4 \times 10^4$ | ○ |
| Comp. Ex. 1 | No | X | $>1 \times 10^{12}$ | X |
| | Yes | X | $>1 \times 10^{12}$ | X |
| Comp. Ex. 2 | No | X | $>1 \times 10^{12}$ | X |
| | Yes | X | $>1 \times 10^{12}$ | X |
| Comp. Ex. 3 | No | X | $>1 \times 10^{12}$ | X |
| | No | X | $>1 \times 10^{12}$ | X |
| Comp. Ex. 4 | No | ○ | $1.5 \times 10^6$ | ○ |
| | Yes | ○ | $1.7 \times 10^6$ | ○ |
| Comp. Ex. 5 | No | ○ | $4.2 \times 10^7$ | ○ |
| | Yes | ○ | $4.2 \times 10^7$ | ○ |

As is clear from Table 1, the solutions of the carbon nanotube compositions of the present examples were uniformly dispersed or dissolved, and uniform coated films were formed. In addition, they also demonstrated low values of surface resistance. In particular, surface resistance values were able to be lowered even more by performing ultrasonic treatment.

On the other hand, the carbon nanotube compositions of Comparative Examples 1 to 3 demonstrated inferior surface resistance values and coated film appearance. The electrical conductivity of Comparative Examples 4 and 5 that used conducting composition 1 was not adequate.

INDUSTRIAL APPLICABILITY

The carbon nanotube composition of the present invention can be used by simple coating methods such as coating, spraying, casting, and dipping for various types of antistatic agents, capacitors, batteries, fuel cells and their polymer electrolyte membranes, electrode layers, catalyst layers, gas diffusion layers, separators and other members, EMI shields, chemical sensors, display elements, non-linear materials, preservatives, adhesives, fibers, spinning materials, antistatic coatings, corrosion-resistant coatings, electrodeposition coatings, plating primers, conducting primers for electrostatic coating, electrical corrosion prevention and improvement of battery charge storage.

In addition, a composite of the present invention is used as an industrial packaging material for semiconductors, electrical appliance electronic components and so forth, an antistatic film of electronic photography and recording materials such as overhead projector film and slide film, for preventing accumulation of electrical charge of magnetic recording tape such as audio tape, video tape, computer tape and floppy disks, for LSI wiring of electronic devices, electron guns (sources) and electrodes of field emission displays (FED), hydrogen storage agent, for prevention of accumulation of electrical charge on the surfaces of input and display devices such as transparent touch panel, electroluminescent display, and liquid crystal displays, and as light emitting materials that form transparent electrodes and organic electroluminescent elements, buffer materials, electron transfer materials, hole transfer materials, fluorescent materials, thermal transfer sheets, transfer sheets, thermal transfer imaging sheets and imaging sheets.

The invention claimed is:

1. A carbon nanotube composition that contains a water soluble conducting polymer having an acidic group (a), a water or a water-containing organic solvent (b), carbon nanotubes (c), and a silane coupling agent (g) represented by the following formula (1):

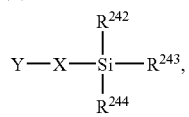
(1)

wherein in the formula (1) $R^{242}$, $R^{243}$ and $R^{244}$ respectively and independently represent a group selected from the group consisting of hydrogen, a linear or branched alkyl group having 1 to 6 carbon atoms, linear or branched alkoxy group having 1 to 6 carbon atoms, amino group, acetyl group, phenyl group and halogen group, X represents the following:

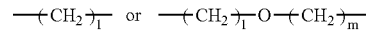

l and m represent values from 0 to 6, and Y represents a group selected from the group consisting of a hydroxyl group, thiol group, amino group, epoxy group and epoxycyclohexyl group.

* * * * *